(12) United States Patent
Kwon et al.

(10) Patent No.: US 9,356,815 B2
(45) Date of Patent: May 31, 2016

(54) TRANSMITTER, RECEIVER AND CONTROLLING METHOD THEREOF

(71) Applicant: SAMSUNG ELECTRONICS CO., LTD., Suwon-si (KR)

(72) Inventors: Soon-chan Kwon, Incheon (KR); Min-ho Kim, Suwon-si (KR); Jung-il Han, Seongnam-si (KR); Gyong-su Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/484,584

(22) Filed: Sep. 12, 2014

(65) Prior Publication Data

US 2015/0071375 A1    Mar. 12, 2015

Related U.S. Application Data

(60) Provisional application No. 61/876,984, filed on Sep. 12, 2013.

(30) Foreign Application Priority Data

May 9, 2014    (KR) .................. 10-2014-0055634

(51) Int. Cl.
  *H04L 27/26*    (2006.01)
  *H04L 5/00*    (2006.01)
(52) U.S. Cl.
  CPC .......... *H04L 27/2628* (2013.01); *H04L 5/0048* (2013.01); *H04L 27/261* (2013.01); *H04L 27/2602* (2013.01); *H04L 27/2675* (2013.01)
(58) Field of Classification Search
  CPC .............. H04L 27/2602; H04L 27/261; H04L 27/2613; H04L 27/2628; H04L 27/265; H04L 25/023; H04L 27/2656; H04L 27/2657; H04L 5/0048; H04L 27/2675; H04B 7/155; H04B 7/265; H04B 17/336; H04W 52/241
  See application file for complete search history.

(56) References Cited

U.S. PATENT DOCUMENTS 8,363,740 B2 *   1/2013   Stadelmeier .......... H04L 5/0007
                                                    375/219
8,750,435 B2 *   6/2014   Yokokawa ............ H04L 5/0048
                                                    375/260

(Continued)

FOREIGN PATENT DOCUMENTS

EP          2536131      * 12/2012
WO      2010/071273 A1    6/2010

OTHER PUBLICATIONS

International Search Report dated Dec. 17, 2014 issued by International Searching Authority in counterpart International Application No. PCT/KR2014/008352.

(Continued)

*Primary Examiner* — Hirdepal Singh
(74) *Attorney, Agent, or Firm* — Sughrue Mion, PLLC

(57) ABSTRACT

A transmitter includes a frame generator which generates a plurality of frames each of which includes a preamble symbol and a data symbol, a pilot inserter which inserts a plurality of first pilots in the preamble symbol according to a predetermined first arrangement pattern and inserts a plurality of second pilots in a data symbol according to a second arrangement pattern, and a transmitting unit which transmits the plurality of frames in which the first and second pilots are inserted. Accordingly, a memory needed to store pilots may be reduced and precise synchronization may be performed based on an extended number of pilots.

20 Claims, 12 Drawing Sheets

(56) References Cited

U.S. PATENT DOCUMENTS

| | | |
|---|---|---|
| 2008/0056391 A1 | 3/2008 | Camp |
| 2008/0137761 A1* | 6/2008 | Stadelmeier ........ H04L 5/0007 375/260 |
| 2009/0190677 A1 | 7/2009 | Jokela et al. |
| 2010/0014600 A1 | 1/2010 | Li et al. |
| 2011/0142176 A1 | 6/2011 | Yokokawa et al. |
| 2011/0164671 A1* | 7/2011 | Matsumura .................. 375/229 |
| 2014/0009685 A1* | 1/2014 | Goto .................. H04L 27/2659 348/720 |
| 2015/0055728 A1* | 2/2015 | Ko et al. ...................... 375/295 |

OTHER PUBLICATIONS

Written Opinion dated Dec. 17, 2014 issued by International Searching Authority in counterpart International Application No. PCT/KR2014/008352.

* cited by examiner

TRANSMITTER, RECEIVER AND CONTROLLING METHOD THEREOF

CROSS-REFERENCE TO RELATED APPLICATION(S)

This application claims priority from Korean Patent Application No. 10-2014-0055634, filed on May 9, 2014, in the Korean Intellectual Property Office, and from U.S. Provisional Application No. 61/876,984 filed on Sep. 12, 2013 in the United States Patent and Trademark Office, the disclosures of which are incorporated herein by reference in their entirety.

BACKGROUND

1. Field

Methods and apparatuses consistent with the exemplary embodiments relate to a transmitter, a receiver and a controlling method thereof, more specifically, to a transmitter and a receiver using an Orthogonal Frequency Division Multiplex (OFDM) scheme and a controlling method thereof.

2. Description of the Related Art

In the information-oriented $21^{st}$ society, we are entering into an era when a broadcasting communication service becomes more digitized, has more broadcast channels and wider bandwidths, and achieves a higher quality. In particular, recently, as the supply for a high definition digital television (HDTV), portable media player (PMP), and a portable broadcasting device has become increased, demands for a support for various reception methods for the digital broadcasting service have also increased.

In response to such demands, standardization groups establish various standards to provide various services which can satisfy user needs. Therefore, ways for providing users with better services through superior performances are sought for.

In particular, in case where channel environments are poor, or a mobile device such as a smartphone should receive information in a stable way, precise synchronization should be carried out. Further, in case of receiving high capacity information, performance to carry out synchronization needs to be sustained. Accordingly, an alternative method needs to be suggested which performs a precise synchronization, thereby maintaining optimized performances.

SUMMARY

One or more exemplary embodiments provide a transmitter, a receiver and a controlling method thereof for improving synchronization performance by increasing the number of pilots which are inserted into a frame.

According to an aspect of an exemplary embodiment, there is provided a transmitter which may include: a frame generator configured to generate a plurality of frames each of which includes a preamble symbol and a data symbol; a pilot inserter configured to insert a plurality of first pilots in the preamble symbol according to a first arrangement pattern and insert a plurality of second pilots in the data symbol according to a second arrangement pattern; and a transmitting unit configured to transmit the plurality of frames in which the first pilots and the second pilots are inserted.

The pilot inserter may determine the number and insertion positions of the second pilots in the data symbol based on a fast Fourier transform (FFT) size of the data symbol.

The FFT size of the data symbol may be one of 8K, 16K and 32K. If the FFT size is 8K, the pilot inserter may insert 90 second pilots according to the second arrangement pattern. If the FFT size is 16K, the pilot inserter may insert 180 second pilots according to the second arrangement pattern. If the FFT size is 32K, the pilot inserter may insert 360 second pilots according to the second arrangement pattern.

The transmitter may further include a storage configured to store information on the number and insertion positions of the second pilots inserted in the data symbol of a first FFT size, which is the largest size among FFT sizes of the data symbol. If a data symbol of a second FFT size which is different from the first FFT size is input, the pilot inserter may modify the information on the number and insertion positions of the second pilots which is stored in the storage, depending on a rate of the first FFT size to the second FFT size and may determine the number and insertion positions of the second pilots which will be inserted into the data symbol of the second FFT size.

The first arrangement pattern may be indicated in a table showing subcarrier indexes corresponding to positions of the first pilots in the preamble symbol as shown in Table 2 or 5.

The second arrangement pattern may be indicated in a table showing subcarrier indexes corresponding to positions of the second pilots in the data symbol as shown in Table 3, 4, 6 or 7.

Both of the first pilots and the second pilots may be continual pilots having the same frequency band, and the pilot inserter may insert the continual pilots not to overlap with a scattered pilot inserted in the data symbol.

According to an aspect of another exemplary embodiment, there is provided a receiver which may include: a receiving unit configured to receive a plurality of frames, each of which includes a preamble symbol in which first pilots are inserted according to a first arrangement pattern and a data symbol in which second pilots are inserted according to a second arrangement pattern; and a signal processor configured to detect the first pilots and the second pilots respectively based on the first arrangement pattern and the second arrangement pattern, synchronize the preamble symbol and the data symbol respectively using the detected first pilots and second pilots, and detect data from the data symbol.

The first arrangement pattern may be indicated in a table showing subcarrier indexes corresponding to positions of the first pilots in the preamble symbol as shown in Table 2 or 5.

The second arrangement pattern may be indicated in a table showing subcarrier indexes corresponding to positions of the second pilots in the data symbol as shown in Table 3, 4, 6 or 7.

According to an aspect of still another exemplary embodiment, there is provided a method of controlling a transmitter which may include: generating a plurality of frames each of which includes a preamble symbol and a data symbol, inserting a plurality of first pilots in the preamble symbol according to a predetermined first arrangement pattern and inserting a plurality of second pilots in the data symbol according to a second arrangement pattern; and transmitting the plurality of frames in which the first pilots and the second pilots are inserted.

The inserting may include determining the number and insertion positions of the second pilots based on a FFT size of the data symbol.

The FFT size of the data symbol may be one of 8K, 16K and 32K. The inserting may include inserting 90 second pilots according to the second arrangement pattern if the FFT size is 8K, inserting 180 second pilots according to the second arrangement pattern if the FFT size is 16K, or inserting 360 second pilots according to the second arrangement pattern if the FFT size is 32K.

The method may further include storing information on the number and insertion positions of second pilots insert into a data symbol of a first FFT size, which is the largest size among FFT sizes of the data symbol. If a data symbol of a second FFT size which is different from the first FFT size is input, the inserting may include modifying the information on the number and insertion positions of the second pilots based on the rate of the first FFT size to the second FFT size, and determining the number and insertion positions of the second pilots which will be inserted into the data symbol of the second FFT size.

The first arrangement pattern may be indicated in a table showing subcarrier indexes corresponding to positions of the first pilots in the preamble symbol as shown in Table 2 or 5.

The second arrangement pattern may be indicated in a table showing subcarrier indexes corresponding to positions of the second pilots in the data symbol as shown in Table 3, 4, 6 or 7.

Both of the first pilots and the second pilots may be continual pilots having the same frequency band, and the inserting may include inserting the continual pilots not to overlap with a scattered pilot inserted in the data symbol.

According to an aspect of still another exemplary embodiment, there is provided a method of controlling a receiver which may include: receiving a plurality of frames, each of which includes a preamble symbol in which a plurality of first pilots are inserted according to a first arrangement pattern and a data symbol in which a plurality of second pilots are inserted according to a second arrangement pattern; and detecting the first pilots and the second pilots respectively based on the first arrangement pattern and the second arrangement pattern, synchronizing the preamble symbol and the data symbol respectively using the detected first pilots and second pilots, and detecting data from the data symbol.

The first arrangement pattern may be indicated in a table showing subcarrier indexes corresponding to positions of the first pilots in the preamble symbol as shown in Table 2 or 5.

The second arrangement pattern may be indicated in a table showing subcarrier indexes corresponding to positions of the second pilots in the data symbol as shown in Table 3, 4, 6 or 7.

According to the various exemplary embodiments shown above, a memory needed to store information about the pilots may be reduced and precise synchronization may be performed based on an increased number of pilots.

BRIEF DESCRIPTION OF THE DRAWINGS

These and/or other aspects of the exemplary embodiments will become apparent and more readily appreciated in conjunction with the accompanying drawings, in which.

DETAILED DESCRIPTION OF THE EXEMPLARY EMBODIMENTS

Figure 1:
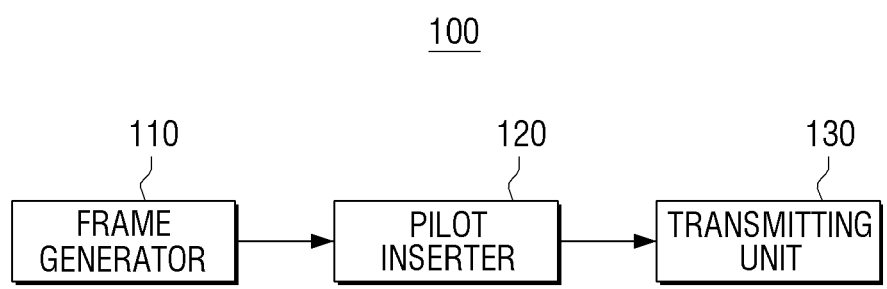
FIG. 1 is a block diagram demonstrating configurations of a transmitter according to an exemplary embodiment.

Hereinafter, the exemplary embodiments will be described in greater detail with reference to the accompanying drawings.

In the following description, like reference numerals are used for like elements when they are depicted in different drawings. The matters defined in the description, such as detailed construction and elements, are provided to assist in a comprehensive understanding of exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram demonstrating configurations of a transmitter according to an exemplary embodiment.

According to FIG. 1, the transmitter 100 includes a frame generator 110, a pilot inserter 120 and a transmitting unit 130.

The frame generator 110 may generate a plurality of frames, each of which includes a preamble symbol and a data symbol. As an exemplary embodiment, a Second Generation Digital Terrestrial Television Broadcasting (DVB-T2) system applies a Physical Layer Pipe (PLP) concept which allows providing various broadcasting services having different modulation schemes, channel coding rates, time and cell interleaving lengths, etc. to one broadcast channel.

A PLP indicates a signal path which is independently processed. That is, each service (e.g., video, expanded video, audio, data, etc.) may be transmitted and received through a plurality of radio frequency (RF) channels. Here, a PLP is a path through which such service is transmitted or a stream which is transmitted through the path. Further, a PLP may be positioned on slots which are distributed at time intervals along a plurality of RF channels or may be distributed at time intervals along one RF channel. That is, one PLP may be distributed and be transmitted with time intervals on one RF channel or a plurality of RF channels.

A PLP has an Input mode A which provides one PLP and an Input mode B which provides a plurality of PLPs. In particular, in case of supporting the Input mode B, the PLP provides not only a robust specific service but also an increased time interleaving length by transmitting one stream in a distributed manner, thereby achieving a time diversity gain. Further, in case of receiving only a specific stream, the PLP allows a receiver to be used at a low power by turning off a receiver while not receiving the specific stream, and thus, it may be suitable for providing a wireless or mobile broadcasting service.

Here, the time diversity is a technology which is applied to mitigate degradation of a transmission quality by having a transmitting side transmit the same signal multiple times with a regular time interval and a receiving side synthesize the received signals to obtain a higher transmission quality signal.

Transmission efficiency can be improved by incorporating information that can be commonly transmitted through plural PLPs into one PLP, and then, transmitting the information through this PLP, which is referred to as a common PLP or PLP0. PLPs other than PLP0 can be used for data transmission, and are referred to as data PLPs.

When the above PLP is used, a standard definition television (SDTV) program can be provided at a mobile device while a HDTV program can be received at home. In addition, when the above PLP is used, a differentiated service can be enabled which provides various broadcasting services to viewers through a broadcasting station or a broadcasting contents provider, and broadcasting contents can be received in even fringe areas where the reception of broadcasting contents is difficult.

In other words, the frame generator 110 may generate a plurality of frames, each of which includes a preamble symbol and data symbols, and perform signal-processing for each of paths, by mapping data to be transmitted to at least one of signal processing paths. For instance, signal processing may include at least one process of input stream synchronization, delay compensation, null packet deletion, cyclic redundancy check (CRC) encoding, header insertion, coding, interleaving and modulation. A frame, which is signal-processed in each of paths, together with signaling information, is generated as a transmission frame, and the generated transmission frame is transmitted to a receiver (not illustrated).

According to an exemplary embodiment, a preamble symbol may be used to inform a start point of a frame to synchronize the frame. In particular, according to the DVB-T2, a preamble symbol is classified into a P1 symbol and a P2 symbol. The P1 symbol indicates a symbol informing a start of a frame, and the P2 indicates a symbol including a signaling region.

According to an exemplary embodiment, a preamble symbol is intended to use only the P2 symbol without differentiating the P1 symbol from the P2 symbol. Specifically, the P2 symbol according to the present embodiment includes a signaling region and also performs a function of the P1 symbol. That is, after information which informs a start of a frame is obtained through a synchronization operation in the time domain, information which is required to perform additional fine synchronization should be inserted into a P2 symbol, which can be realized by inserting pilots, as will be described below.

A preamble symbol according to an exemplary embodiment may correspond to a P2 symbol which is used in the DVB-T2, but is not limited to the P2 symbol and may be any preamble symbol as long as it performs all functions of both the P1 and the P2 symbols.

Figure 2:
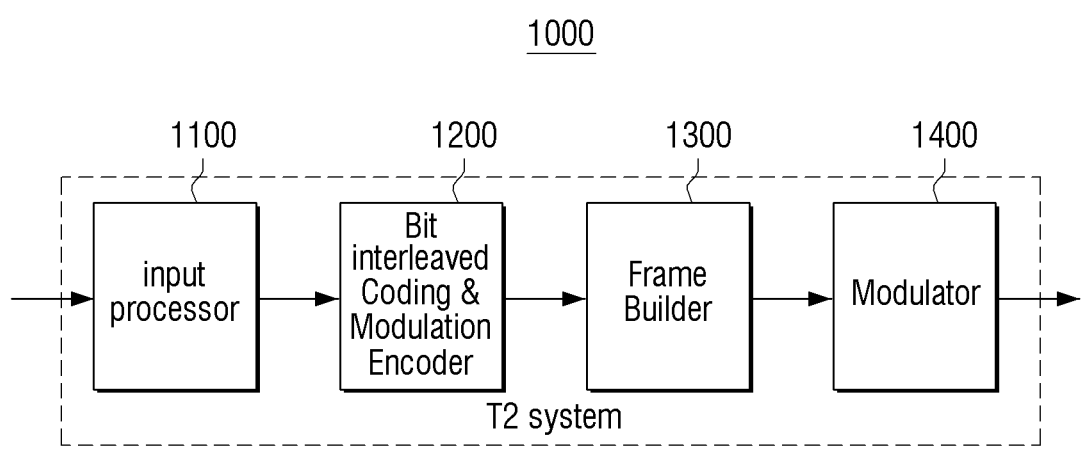
FIG. 2 is a block diagram which is provided to explain configurations of a Second Generation Digital Terrestrial Television Broadcasting (DVB-T2) system according to an exemplary embodiment.

FIG. 2 is a block diagram of explaining configurations of a DVB-T2 system according to an exemplary embodiment.

Referring to FIG. 2, a DVB-T2 transmitting system 1000 may include an input processor 1100, a bit interleaved coding and modulation (BICM) encoder 1200, a frame builder 1300 and a modulator 1400.

The DVB-T2 transmitting system 1000 is identical to that defined in the DVB-T2, one of European digital broadcasting standards, and thus, the respective configurations thereof will be briefly explained below The input processor 1100 generates a baseband frame from an input stream of data to be serviced. Herein, the input stream may be an MPEG-2 transport stream (TS), a generic stream (GS), etc.

The BICM encoder 1200 determines a forward error correction (FEC) coding rate and a constellation order depending on a region where data to be serviced will be transmitted, that is, a fixed PHY frame or mobile PHY frame, and then performs encoding. Signaling information on the data to be serviced may be encoded through a separate BICM encoder (not illustrated) or encoded by the BICM encoder 1200 along with the data to be serviced, depending on how the DVB-T2 transmission system is implemented.

The frame builder 1300 and the modulator 1400 determine an OFDM parameter for a signaling region and an OFDM parameter for a region where the data to be serviced will be transmitted to configure a frame and adds a sync region to generate the frame. Further, they perform modulation for modulating the generated frame to an RF signal and transmit the modulated RF signal to a receiver.

Herein, the modulator 1400 may include a multiple input single output (MISO) processing unit (not illustrated), a pilot inserter (not illustrated), an inverse fast Fourier transform (IFFT) unit (not illustrated), a peak to average power ratio (PAPR) reduction unit (not illustrated), a guard interval inserter (not illustrated), a P1 symbol inserter (not illustrated) and a digital to analog (D/A) converter unit (not illustrated).

However, the transmitter 100 according to the present embodiment does not include a P1 symbol inserter (not illustrated). Therefore, P1 symbols are not inserted in a plurality of frames which are generated at the frame generator 110.

To be specific, according to the DVB-T2, in response to inserting of a P1 symbol in a T2 frame, a receiver (not illustrated) may perform synchronization in the time domain by using the P1 symbol, and may perform a precise synchronization by using continual pilots inserted in data symbols and adjusting timing offsets, sampling offsets and frequency offsets. According to the present embodiment, however, the P1 symbol is not separately inserted in a plurality of frames generated at the frame generator 110. Instead, a preamble symbol which does not differentiate the P1 symbol from the P2 symbol is inserted in the plurality of frames. Synchronization is performed in the time domain by using this preamble symbol, and the continual pilots are additionally inserted in the preamble symbol. Thus, the receiver can perform synchronization in the frequency domain by using the continual pilots which are inserted in the preamble symbol and data symbol. As a result, after performing synchronization in the time domain, the receiver may adjust timing offsets, sampling offsets and frequency offsets in the frequency domain, thereby performing a precise synchronization.

Meanwhile, the frame generation with regard to FIG. 1 may be performed in the frame builder 1300, and a pilot insertion that will be explained below may be performed at a pilot inserter (not illustrated) that may be included in the modulator 1400.

Figure 3:
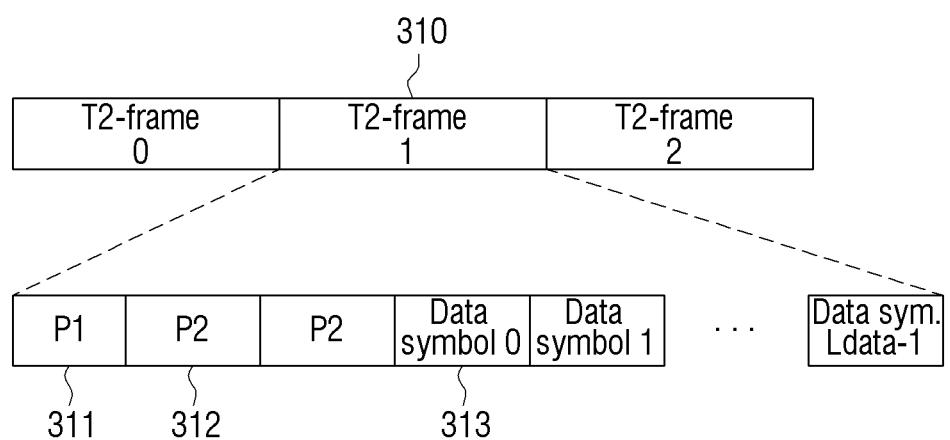
FIG. 3 is a diagram illustrating a structure of a T2 frame which is used for the DVB-T2.

FIG. 3 is a diagram illustrating a structure of a T2 frame used for the DVB-T2.

Referring to FIG. 3 which illustrates a structure of a plurality of T2 frames in the time domain of DVB-T2, one T2 frame 310 may include a P1 symbol 311 which informs a start point of the T2 frame, a P2 symbol 312 which transmits an L1 (Layer1) signal, and data symbols 313 which transmit a broadcast signal.

To be specific, the P1 symbol 311 is positioned at a forepart of the T2 frame and may be used to detect a start point of the T2 frame. Further, the P1 symbol uses a size of 1K FFT and is a signal in a form of a guard interval. Furthermore, the P1 symbol 311 in the frequency domain uses 853 subcarriers to 384 subcarriers of 1K FFT, and may transmit seven (7)-bit information.

Meanwhile, a frame generated in the frame generator 110 according to the present embodiment does not include the P1 symbol illustrated in FIG. 3.

The pilot inserter 120 may insert a first pilot in a preamble symbol according to a first arrangement pattern, and insert second pilots in data symbols according to a second arrangement pattern which is different from the first arrangement pattern.

According to the DVB-T2, pilots, particularly, continuous pilots, are not inserted in a preamble symbol. However, the pilot inserter 120 according to the present embodiment may insert pilots in the preamble symbol. Accordingly, a receiver (not illustrated) may perform precise fine synchronization based on the continual pilots inserted in the preamble symbol.

The first arrangement pattern is different from the second arrangement pattern. Thus, insertion positions of the first pilot in the preamble symbols are different from those of the second pilots in the data symbols.

The transmitting unit 130 may transmit a plurality of frames in which the first and second pilots are inserted.

Figure 4:
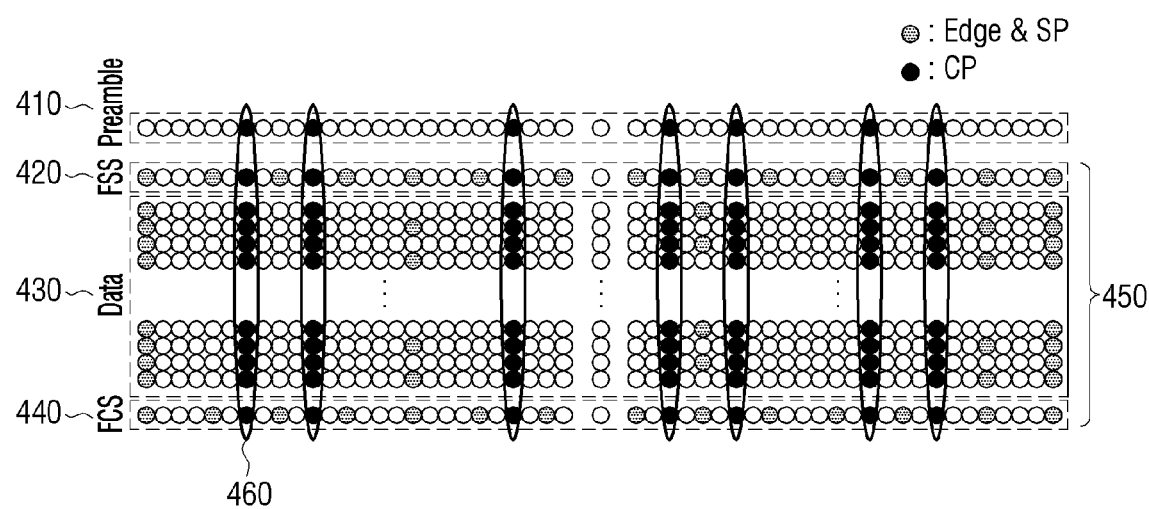
FIG. 4 is a diagram illustrating a frame in which pilots are inserted, according to an exemplary embodiment.

FIG. 4 is a diagram illustrating a frame in which pilots are inserted, according to an exemplary embodiment.

FIG. 4 illustrates a configuration of OFDM symbols, in which the horizontal axis is a frequency axis and the vertical axis is a time axis. An OFDM symbol is divided into a preamble symbol 410, a frame starting symbol 420, a data symbol 430 and a frame closing symbol 440. Hereinafter, a set of the frame start symbol 420, the data symbol 430 and the closing symbol 440 is defined to a data symbol 450.

Referring to FIG. 4, the pilots 460 are inserted in both the preamble symbol 410 and the data symbol 450. Herein, the pilots 460 may be classified into first pilots inserted in the preamble symbol 410 and second pilots inserted in the data symbol 450. However, the first pilots and the second pilots are differentiated from each other merely based on the arrangement pattern and the kind of the inserted symbols. The first and second pilots perform the same functions.

The pilots 460 are continual pilots, and may be inserted in the same frequency location. In other words, as described above, according to the DVB-T2, continual pilots are not inserted in a preamble symbol (a P1 symbol or a P2 symbol), whereas, according to the present embodiment, the continual pilots are insert in the preamble symbol 410.

The pilots 460 which are inserted in the preamble symbol 410 and the data symbol 450 may be used to perform synchronization.

The number of the pilots 460 to be inserted may increase to twice as many as the number of pilots used in the DVB-T2. When the number of the pilots increases, a receiver (not illustrated) may perform more precise synchronization due to the increased number of pilots.

For instance, when the receiver receives an HD-grade video and an ultra HD (UHD)-grade video, the HD-grade video has a less amount of data than the UHD-grade video. Thus, the receiver may perform sufficient synchronization using only the number of pilots required in the DVB-T2.

However, when the UHD-grade video is received, since the amount of data and processing speed increase, more precise and faster synchronization are required. Therefore, when the transmitter 100 inserts an increased number of pilots in a frame, the receiver may perform faster and more precise synchronization by using the increased number of pilots. Further, the receiver may perform synchronization by using pilots inserted in a preamble symbol, and thus, may mitigate inconvenience caused by a scheme, as in the DVB-T2, of performing synchronization both in the time domain and the frequency domain, thereby further improving the processing speed at which pilots are processed. Herein, the increased number of pilots are defined to be extended pilots.

As another example, when the receiver is a fixed device, the receiver such as a TV maintains robustness against channel environments, compared with a mobile device. To the contrary, when the receiver is a mobile device, the receiver exhibits relatively lower robustness against channel environments. Thus, when the receiver is a mobile device, if the transmitter 100 inserts extended pilots in a frame and transmits as described above, the receiver may perform a precise synchronization using extended pilots, and thus, may maintain robustness against channel environments.

Such extended pilots may vary depending on FFT sizes of a symbol as shown in table 1.

TABLE 1

| FFT mode | Normal Mode | Extended Mode | +/− |
|---|---|---|---|
| 32K | 180 | 360 | +180 |
| 16K | 90 | 180 | +90 |
| 8K | 45 | 90 | +45 |

To be specific, when the FFT size is 32K, the number of extended pilots may be 360, which is two times as many as 180, the number of conventionally inserted pilots. When the FFT size is 16K, the number of extended pilots may be 180, which is also two times as many as 90, the number of conventionally inserted pilots. When the FFT size is 8K, the number of extended pilots may be 90, which is two times as many as 90, the number of conventionally inserted pilots.

Further, the increased number of extended pilots should be inserted in a position where the extended pilots do not overlap with scattered pilots inserted in the data symbol 450.

The above-described extended pilots may be inserted both in the preamble symbol 410 and the data symbol 450. However, according to an exemplary embodiment, 45 pilots, not 90 extended pilots, are inserted in the preamble symbol 410 of the 8K FFT size, and different numbers of extended pilots are inserted in the data symbol 450 depending on FFT sizes.

A way that the first and second pilots inserted in the preamble symbol 410 and data symbol 450 respectively in the same frequency location as illustrated in FIG. 4 will be explained, with reference to FIG. 5. Here, that the first and second pilots inserted in the preamble symbol 410 and data symbol 450 at the same frequency location also means that the first and second pilots are inserted not just at the same frequency location but also at a position which covers the same frequency band. In other words, there may exist a frequency band that can be covered by a single pilot. Thus, even if the first pilot and the second pilot are not inserted at a numerically completely identical frequency location, if the first and second pilots are inserted in a position that can cover the same frequency band, the first and second pilots can perform the same function.

Figure 5:
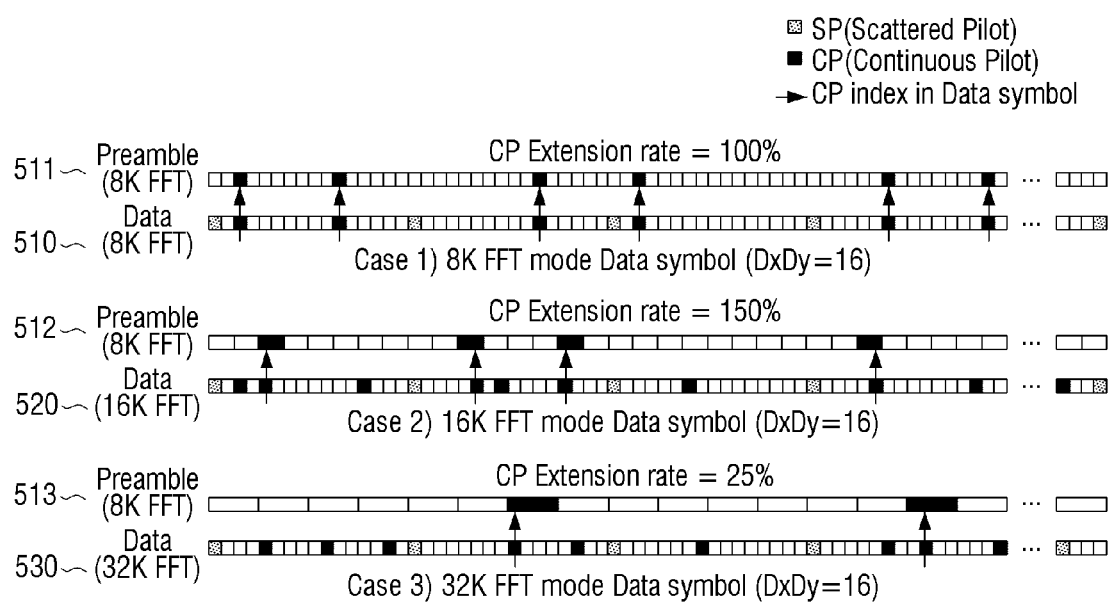
FIG. 5 is a diagram illustrating pilots inserted in a preamble symbol, according to an exemplary embodiment.

FIG. 5 is a diagram illustrating pilots which are inserted in a preamble symbol, according to an exemplary embodiment.

Referring to FIG. 5, there exist data symbols 510, 520 and 530 having FFT sizes of 8K, 16K and 32K, respectively, and the pilot inserter 120 may insert first pilots in preamble symbols 511, 512 and 513 based on second pilots which are inserted in the data symbols 510, 520 and 530 having different sizes.

To be specific, when the pilot inserter 120 inserts the first pilots in the preamble symbol 511 of the 8K FFT size based on the second pilots inserted in the data symbol 510 of the 8K FFT size, since the FFT size of the data symbol 510 and that of the preamble symbol 511 is 8K, which is the same as each other, the pilot inserter 120 may insert the first pilots in positions in the preamble symbol 511 which correspond to position where the second pilots are inserted in the data symbol 510.

When the pilot inserter 120 inserts the first pilots in the preamble symbol 512 of a 8K FFT size based on the second pilots inserted in the data symbol 520 of a 16K FFT size, since the FFT size of the preamble symbol 512 has decreased to a half of that of the data symbol 520, the first pilots which are inserted in the preamble symbol 512 should cover a frequency band which is two times as wide as a frequency band which is covered by the second pilots inserted in the data symbol 520. Considering the above, the pilot inserter 120 may insert the first pilots in the preamble symbol 512 based on the positions where the second pilots are inserted in the data symbol 520.

When the pilot inserter 120 inserts the first pilots in the preamble symbol 513 of a 8K FFT size based on the second pilots inserted in the data symbol 530 of a 32K FFT size, since the FFT size of the preamble symbol 513 has decreased to 25% of the FFT size of the data symbol 530, the first pilots which are inserted in the preamble symbol 513 should cover a frequency band which is four times as wide as a frequency band which is covered by the second pilots inserted in the data symbol 530. Considering the above, the pilot inserter 120 may insert the first pilots in the preamble symbol 513 based on the insertion positions of the second pilots in the data symbol 530.

Meanwhile, the data symbols 510, 520 and 530 have different FFT sizes, and the pilot inserter 120 may change the number and the insertion positions of the second pilots based on the FFT sizes of the data symbols.

Figure 6:
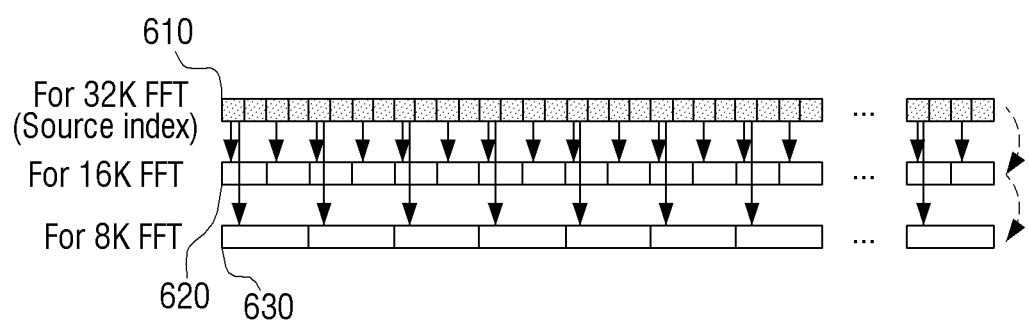
FIG. 6 is a diagram which is provided to explain a process of inserting pilots in data symbols of different FFT sizes, according to an exemplary embodiment.

FIG. 6 is a diagram illustrating a process of inserting pilots in data symbols having different FFT sizes, according to an exemplary embodiment.

Referring to FIG. 6, FFT sizes of data symbols 610, 620 and 630 are 8K, 16K and 32K, respectively. The pilot inserter 120 may insert a different number of second pilots depending on each of the FFT sizes as described above in Table 1.

To be specific, when the FFT size of a data symbol is 8K, the pilot inserter 120 may insert 90 second pilots in the data symbol 630 according to the second arrangement pattern. When the FFT size of the data symbol is 16K, the pilot inserter 120 may insert 180 second pilots in the data symbol 620 according to the second arrangement pattern. When the FFT size of the data symbol is 32K, the pilot inserter 120 may insert 360 second pilots in the data symbol 610 according to the second arrangement pattern.

Herein, the transmitter 100 may further include a storage (not illustrated) which stores information on the number and the insertion positions of the second pilots which are inserted in a data symbol having a first FFT size, which is the largest size of FFT sizes that the data symbol can have. The storage may be implemented in the pilot inserter 120, according to an exemplary embodiment.

When a data symbol having a second FFT size different from the first FFT size is input, the pilot inserter 120 may change the information, stored in the storage, on the number and the insertion positions of the second pilots based on the ratio of the first FFT size to the second FFT size, thereby determining the number and the insertion positions of the second pilots which are inserted in the data symbol having the second FFT size. Here, the storage does not have to store the information on the number and the insertion positions of the second pilots for a data symbol of the largest FFT size. Instead, the storage may store information on the number and the insertion positions of the second pilots for a data symbol of any predetermined FFT size, and apply a corresponding ratio of this predetermined FFT size and the second FFT size.

For instance, referring to FIG. 6, the information on the number and the insertion positions of the second pilots which are inserted in the data symbol 610 of the 32K FFT size may be stored in the storage (not illustrated). Further, when the data symbol 620 of the 16K FFT size is input, the pilot inserter 120 may insert the second pilots in the data symbol 620 of the 16K FFT size based on the number and the insertion positions of the second pilots inserted in the data symbol 610 of the 32K FFT size.

To be specific, as the data symbol 620 of the 16K FFT size has decreased to a half in the FFT size, compared to the data symbol 610 of the 32K FFT size, the second pilots inserted in the data symbol 620 of the 16K FFT size should cover a frequency band which is two times as wide as a frequency band covered by the second pilots insert in the data symbol 610 of the 32K FFT size. Therefore, the pilot inserter 120 may insert the second pilots at positions where the frequency locations of the second pilots inserted in the data symbol 610 of the 32K FFT size are respectively divided by two (2). That is, when the data symbol 620 of the 16K FFT size is input and the number of a frequency location of a second pilot inserted in the data symbol 610 of the 32K FFT size is an odd number, the pilot inserter 120 may insert a second pilot in the data symbol 620 at a frequency location which is calculated by adding one (1) to the odd-number frequency location, and then, dividing it by two (2), and when the number of the frequency location of the second pilot inserted in the data symbol 610 of the 32K FFT size is an even number, the pilot inserter 120 may insert a second pilot in the data symbol 620 at a frequency location which is calculated by dividing the even-number frequency location by two (2).

When the data symbol 630 of the 8K FFT size is input, the pilot inserter 120 may insert second pilots in the data symbol 630 of the 8K FFT size based on the information on the number and the insertion positions of the second pilots inserted in the data symbol 610 of the 32K FFT size.

To be specific, when the FFT size of the data symbol 630 of the 8K FFT size has decreased to a quarter in the FFT size, compared to the data symbol 610 of the 32K FFT size, the second pilots inserted in the data symbol 630 of the 8K FFT size should cover a frequency band which is four times as wide as the frequency band covered by the second pilots inserted in the data symbol 610 of the 32K FFT size. Therefore, when the data symbol 630 of the 8K FFT size is input and the number of a frequency location of a second pilot inserted in the data symbol 610 of the 32K FFT size is an odd number, the pilot inserter 120 may insert a second pilot in the data symbol 630 at a location which is calculated by adding one (1) to the odd-number frequency location and then dividing it by four (4), and when the number of the frequency location of the second pilot inserted in the data symbol 610 of the 32K FFT size is an even number, the pilot inserter 120 may insert a second pilot in the data symbol 630 at a location which is calculated by dividing the frequency location by four (4).

The transmitter 100 does not have to store information about the number and the insertion positions of the second pilots inserted in all of the data symbols 610, 620 and 630 of the 32K, 16K and 8K FFT sizes, respectively. Instead, as long as the transmitter 100 stores only the information on the number and the insertion positions of the second pilots inserted in the data symbol 610 of the 32K FFT, this information may enable the transmitter 100 to determine the number and the insertion positions of the second pilots inserted in the data symbols 620 and 630 of the 16K and 8K FFT sizes, respectively. Consequently, a memory area for storing the information on the number and the insertion positions of the second pilots may be reduced.

When a memory area for storing the information on insertion positions is sufficiently secured, a method may also be realized which stores in the storage and uses not only the information about the number and the insertion positions of the second pilots inserted in the data symbol 610 of the 32K FFT but also the information about the number and the insertion positions of the second pilots inserted in the data symbol 620 and 630 of the 16K and 8K FFT sizes.

The first pilots inserted in the preamble symbol 410 may be inserted in the first arrangement pattern, and the second pilots inserted in the data symbol 450 may be inserted in the second arrangement pattern. As described above, the extended pilots are not the first pilots inserted in the preamble symbol 410 but the second pilots inserted in the data symbol 450.

The first arrangement pattern is shown in Table 2 below which lists subcarrier indexes indicating positions where the first pilots are inserted, according to an exemplary embodiment.

TABLE 2

| FFT | CP position |
|---|---|
| 8K (45) | 41, 173, 357, 505, 645, 805, 941, 1098, 1225, 1397, 1514, 1669, 1822, 1961, 2119, 2245, 2423, 2587, 2709, 2861, 3026, 3189, 3318, 3510, 3683, 3861, 4045, 4163, 4297, 4457, 4598, 4769, 4942, 5113, 5289, 5413, 5585, 5755, 5873, 6045, 6207, 6379, 6525, 6675, 6862 |

Table 2 lists the subcarrier indexes indicating positions in the preamble symbol 410 where the first pilots inserted according to an exemplary embodiment are inserted. As described above, the number of the inserted first pilots is 45. Table 2 is not a table showing subcarrier indexes indicating the insertion positions of the extended pilots.

The second arrangement pattern is shown in Table 3 below which lists subcarrier indexes indicating positions in the data symbol 450 where the second pilots are inserted.

TABLE 3

| FFT | CP position |
|---|---|
| 32K (360) Source Index | 35, 45, 61, 82, 99, 117, 131, 147, 183, 290, 486, 605, 614, 635, 652, 685, 691, 858, 1033, 1187, 1203, 1269, 1341, 1379, 1427, 1582, 1721, 1881, 1906, 1973, 2006, 2819, 2217, 2314, 2425, 2434, 2478, 2526, 2549, 2579, 2709, 2857, 3009, 3043, 3063, 3125, 3173, 3219, 3399, 3506, 3621, 3635, 3674, 3701, 3749, 3762, 3997, 4122, 4257, 4266, 4298, 4333, 4382, 4393, 4539, 4601, 4786, 4797, 4831, 4859, 4881, 4899, 5095, 5393, 5378, 5387, 5473, 5525, 5553, 5587, 5693, 5797, 5937, 5946, 5969, 6005, 6937, 6054, 6139, 6317, 6533, 6558, 6603, 6654, 6675, 6807, 6994, 7153, 7186, 7213, 7233, 7277, 7289, 7467, 7586, 7689, 7701, 7753, 7790, 7813, 7846, 8011, 8117, 8337, 8357, 8389, 8425, 8461, 8477, 8665, 8817, 8893, 8902, 8922, 8949, 8973, 8979, 9177, 9293, 9539, 9547, 9590, 9641, 9641, 9679, 9693, 9885, 10026, 10151, 10185, 10214, 10283, 10341, 10349, 10471, 10553, 10656, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12582, 12649, 12552, 12717, 12755, 12866, 12993, 13150, 13158, 13205, 13217, 13264, 13173, 13445, 13635, 13846, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17637, 17669, 17695, 17770, 17793, 17829, 17939, 18109, 15246, 18274, 18306, 18341, 18365, 18393, 18566, 18733, 18901, 18931, 18969, 18997, 19049, 19077, 19253, 19445, 19589, 19603, 19653, 19686, 19741, 19759, 19989, 20115, 20275, 20293, 220357, 20379, 20437, 20451, 20675, 20781, 20989, 21011, 21050, 21090, 21149, 21155, 21279, 21505, 21537, 21557, 21577, 21603, 21634, 21650, 21789, 21917, 22133, 22154, 22197, 22266, 22323, 22338, 22489, 22651, 22823, 22857, 22314, 22953, 22979, 23019, 23205, 23258, 23361, 23387, 23406, 23441, 23474, 23494, 23685, 23771, 24007, 24041, 24069, 24125, 24149, 24178, 24317, 24466, 24689, 24699, 24739, 24765, 24813, 24827, 25061, 25195, 25331, 25369, 25385, 25430, 25465, 25515, 25649, 25761, 25694, 25926, 25981, 26025, 26089, 26099, 26246, 26390, 26569, 26594, 26621, 26660, 26674, 26698, 26910, 27033, 27241, 27449, 27511, 27642, 27801 |
| 16K (180) | 18, 31, 50, 65, 82, 246, 307, 331, 346, 517, 602, 671, 714, 861, 953, 987, 1010, 1157, 1217, 1263, 1290, 1429, 1522, 1563, 1610, 1753, 1818, 1851, 1881, 2061, 2133, 2167, 2197, 2301, 2399, 2430, 2450, 2647, 2694, 2763, 2794, 2899, 2973, 3003, 3027, 3159, 3287, 3302, 3338, 3497, 3593, 3817, 3845, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5671, 5701, 5723, 5895, 5967, 6025, 6051, 6222, 6291, 6331, 6378, 6497, 6579, 6608, 6637, 6818, 6946, 6983, 7021, 7303, 7343, 7366, 7525, 7621, 7683, 7721, 7895, 7983, 8046, 8090, 8199, 8274, 8307, 8325, 8449, 8531, 8559, 8593, 8743, 8835, 8885, 8915, 9055, 9137, 9171, 9197, 9367, 9466, 9493, 9539, 9723, 9881, 9843, 9885, 10059, 10147, 10190, 10226, 10391, 10596, 10545, 10578, 10703, 10703, 10779, 10802, 10825, 10959, 11077, 11133, 11169, 11326, 11429, 11479, 11510, 11629, 11694, 11721, 11747, 11941, 12021, 12063, 12089, 12243, 12350, 12383, 12414, 12598, 12685, 12715, 12758, 12881, 12963, 13013, 13060, 13195, 13297, 13325, 13349, 13517, 13725, 13821 |
| 8K (90) | 9, 25, 41, 154, 173, 301, 357, 477, 505, 609, 645, 761, 805, 909, 941, 1067, 1098, 1199, 1225, 1347, 1397, 1497, 1514, 1633, 1669, 1797, 1822, 1925, 1961, 2089, 2119, 2228, 2246, 2387, 2423, 2546, 2597, 2667, 2709, 2835, 2861, 2993, 3026, 3148, 3189, 3290, 3318, 3473, 3510, 3651, 3683, 3811, 3861, 3991, 4045, 4137, 4163, 4265, 4297, 4417, 4457, 4569, 4598, 4733, 4769, 4901, 4942, 5073, 5113, 5253, 5289, 5389, 5413, 5539, 5585, 5714, 5755, 5847, 5371, 6010, 6045, 6175, 6207, 6345, 6379, 6482, 6525, 6649, 6675, 6862 |

Table 3 lists the subcarrier indexes indicating positions in the data symbol 450 where the second pilots will be inserted according to an exemplary embodiment. Table 3 shows that insertion of the second pilots may be arranged in different positions and in different numbers depending on the FFT size of 32K, 16K or 8K.

In Table 3, the subcarrier indexes in case of the 32K FFT size are source indexes, which means that the pilot inserter 120 determines insertion positions of the second pilots in data symbols of the 16K and 8K FFT sizes, based on the subcarrier indexes in case of the 32K FFT size.

Table 3 indicates subcarrier indexes for 360 second pilots in the case of the 32 FFT size, subcarrier indexes for 180 second pilots in the case of the 16K FFT size, and subcarrier indexes for 90 second pilots in the case of the 8K FFT size, as described referring to Table 1 above.

When a memory area for storing information on insertion positions is sufficiently secured, a scheme may also be realized which simultaneously stores in the storage and uses the information on the subcarrier indexes for the 32K FFT size and the information on the subcarrier indexes for the 16K FFT size and the 8K FFT size.

The second arrangement pattern may be further formed as shown in Table 4 below, which is different from Table 3.

The pilot inserter 120 may insert the first and second pilots not to overlap with scattered pilots inserted in the data symbol 450. Further, the first and second pilots are continual pilots, and the subcarrier indexes defined in Tables 2, 3 and 4 indicate the number and the insertion positions of the continual pilots.

The pilot inserter 120 according to still another exemplary embodiment may insert a less number of first and second pilots than those indicated in the subcarrier indexes defined in

TABLE 4

| FFT | CP position |
|---|---|
| 32K (380) Source Index | 163, 290, 466, 605, 614, 635, 662, 685, 691, 858, 1033, 1187, 1203, 1269, 1341, 1379, 1427, 1582, 1721, 1861, 1906, 1925, 1973, 2006, 2019, 2217, 2314, 2425, 2434, 2478, 2526, 2549, 2579, 270*, 2857, 3009, 3043, 3083, 3125, 3173, 3219, 3399, 3506, 3621, 3635, 3674, 3701, 3749, 3762, 3997, 4122, 4257, 4266, 4298, 4333, 4382, 4393, 4539, 4601, 4786, 4797, 4831, 4859, 4891, 4899, 5095, 5293, 5378, 5387, 5473, 5525, 5553, 5587, 5693, 5797, 5937, 5946, 5989, 6005, 6037, 6054, 6139, 6317, 6501, 6533, 6558, 6603, 6654, 6675, 6807, 6994, 7163, 7185, 7213, 7233, 7277, 7289, 7487, 7586, 7669, 7701, 7753, 7790, 7813, 7845, 8011, 8117, 8337, 8357, 8389, 8425, 8461, 8477, 8565, 8817, 6993, 8902, 8922, 8973, 8979, 9177, 9293, 9539, 9547, 9590, 9641, 9679, 9693, 9885, 10026, 13151, 10185, 10214, 10283, 10341, 10349, 10471, 10553, 10646, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12592, 12619, 12668, 12717, 12755, 12856, 12993, 13150, 13158, 13205, 13217, 13254, 13273, 13445, 13635, 13648, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17637, 17669, 17695, 17770, 17793, 17829, 17939, 18109, 18246, 18274, 18806, 18341, 18365, 18393, 18566, 18733, 18901, 18931, 18969, 18997, 19049, 19077, 19253, 19445, 19589, 19603, 19653, 19686, 19741, 19769, 19989, 20115, 20275, 20293, 20357, 20379, 20437, 20451, 20675, 20781, 20989, 21011, 21050, 21090, 21149, 21155, 21279, 21405, 21537, 21557, 21577, 21603, 21634, 21650, 21789, 21917, 22133, 22154, 22197, 22338, 22466, 22649, 22651, 22823, 22857, 22914, 22958, 22979, 23019, 23205, 23258, 23361, 23387, 232406, 23441, 23474, 23493, 23685, 236881, 24007, 24941, 24069, 24125, 24149, 24176, 24317, 24486, 24669, 24699, 24733, 24765, 24913, 24627, 25061, 25195, 25331, 25389, 25365, 25430, 25485, 25515, 25649, 25761, 25894, 25926, 25981, 26025, 26089, 26099, 26246, 26390, 26509, 26594, 26621, 26650, 26674, 26698, 26910, 27033, 27241, 27275, 27285, 27301, 27322, 27339, 27357, 27371, 27387, 27445, 27511, 27642, 27801 |
| 16K (180) | 82, 243, 307, 331, 346, 517, 602, 671, 714, 861, 953, 987, 1010, 1157, 1217, 1263, 1290, 1429, 1522, 1563, 1610, 1753, 1818, 1851, 1881, 2061, 2133, 2167, 2197, 2301, 2399, 2430, 2450, 2647, 2694, 2763, 2794, 2899, 2973, 3003, 3027, 3158, 3267, 3302, 3338, 3497, 3593, 3617, 3645, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5674, 5701, 5723, 5895, 5997, 6026, 6051, 6222, 6291, 6331, 6376, 6497, 6579, 6609, 6637, 6818, 6946, 6983, 7021, 7201, 7303, 7343, 7356, 7525, 7621, 7693, 7721, 7895, 7983, 8046, 8090, 8199, 8274, 8907, 8925, 8449, 8531, 8539, 8593, 8743, 8835, 8885, 8915, 9055, 9137, 9171, 9197, 9367, 9468, 9539, 9723, 9801, 9846, 9885, 10058, 10147, 10190, 10226, 10391, 10506, 15045, 10578, 10703, 10779, 10802, 10825, 10959, 11077, 11138, 11169, 11326, 11429, 11479, 11510, 11629, 11694, 11721, 11747, 11941, 12021, 12053, 12089, 12253, 12350, 12383, 12414, 12598, 12685, 12715, 12758, 12891, 12963, 13013, 13050, 13195, 13297, 13325, 13349, 13517, 13536, 13651, 13670, 13686, 13725, 13921 |
| 8K (90) | 41, 154, 173, 301, 357, 477, 505, 609, 645, 761, 805, 909, 941, 1067, 1098, 1199, 1225, 1347, 1397, 1487, 1514, 1633, 1669, 1797, 1822, 1925, 1961, 2089, 2119, 2226, 2245, 2387, 2423, 2546, 2587, 2667, 2709, 2835, 2861, 2993, 3026, 3146, 3189, 3290, 3319, 3473, 3510, 3651, 3683, 3811, 3861, 3991, 4045, 4137, 4163, 4265, 4297, 4417, 4457, 4569, 4598, 4733, 4769, 4901, 4942, 5073, 5113, 5253, 5289, 5389, 5413, 5539, 5585, 5714, 5755, 5847, 5873, 6010, 6045, 6175, 6207, 6342, 6379, 6492, 6525, 6649, 6675, 6819, 6835, 6862 |

Table 4 lists subcarrier indexes indicating positions in the data symbol 450 where the second pilots are inserted according to still another exemplary embodiment. Table 4 shows that insertion of the second pilots may be arranged in different positions and in different numbers depending on the FFT size of 32K, 16K or 8K.

Similarly, in Table 4, the subcarrier indexes in case of the 32K FFT size are source indexes, which means that the pilot inserter 120 determines insertion positions of the second pilots in data symbols of the 16K and 8K FFT sizes, based on the subcarrier indexes in case of the 32K FFT size.

Table 4 indicates subcarrier indexes for 360 second pilots in case where the FFT size is 32K, and subcarrier indexes for 180 second pilots in case where a FFT size is 16K, and subcarrier indexes for 90 second pilots in case where the FFT size is 8K, as described referring to Table 1 above.

When a memory area for storing the information on insertion positions is sufficiently secured, a scheme may also be realized which simultaneously stores in the storage and uses the information on the subcarrier indexes for the 32K FFT size and the information on the subcarrier indexes for the 16K and 8K FFT sizes.

The number and the insertion positions of the first and second pilots defined in above Tables 2, 3 and 4 are defined in a way the number and the insertion positions of the first and second pilots do not overlap with those of scattered pilots inserted in the data symbol 450.

Tables, 2, 3 and 4. In other words, the pilot inserter 120 may insert pilots based on subcarrier indexes which include a less number of pilots than those indicated in the subcarrier indexes defined in Tables 2, 3 and 4, thereby exhibiting the same synchronization performance effect.

To be specific, the first arrangement pattern which includes a less number of pilots than those indicated in the subcarrier indexes defined in Table 2 is defined in Table 5 below.

TABLE 5

| FFT | CP position |
|---|---|
| 8K (44) | 41, 173, 357, 505, 645, 805, 941, 1098, 1225, 1397, 1514, 1669, 1822, 1961, 2119, 2245, 2423, 2587, 2709, 2861, 3026, 3189, 3318, 3510, 3683, 3861, 4045, 4163, 4297, 4457, 4598, 4769, 4942, 5113, 5289, 5413, 5585, 5755, 5873, 6045, 6207, 6379, 6525, 6675 |

Table 5 lists subcarrier indexes indicating positions in the preamble symbol 410 where first pilots are inserted. Here, the number of the inserted first pilots is 44, which is less than 45 which is the number of the first pilots indicated by the subcarrier indexes as defined in Table 2 above.

The second arrangement pattern which includes a less number of pilots than those indicated in the subcarrier indexes defined in Table 3 according to still another exemplary embodiment is defined in Table 6 below.

TABLE 6

| FFT | CP postion |
|---|---|
| 32K (356) Source Index | 35, 45, 61, 82, 99, 117, 131, 147, 163, 290, 486, 605, 614, 635, 662, 685, 691, 858, 1033, 1187, 1203, 1269, 1341, 1379, 1427, 1582, 1721, 1881, 1906, 1925, 1973, 2005, 2019, 2217, 2314, 2425, 2434, 2478, 2526, 2549, 2579, 2709, 2857, 3009, 3043, 3083, 3125, 3173, 3219, 3399, 3506, 3621, 3835, 3674, 3701, 3749, 3752, 3997, 4122, 4257, 4266, 4298, 4333, 4382, 4393, 4539, 4601, 4786, 4797, 4831, 4859, 4881, 4899, 5095, 5293, 5378, 5387, 5473, 5525, 5553, 5587, 5893, 5797, 5937, 5946, 5989, 6005, 6037, 6054, 6139, 6317, 6501, 6533, 6558, 6603, 6654, 6675, 6807, 6994, 7163, 7186, 7213, 7233, 7277, 7289, 7467, 7586, 7689, 7701, 7753, 7790, 7813, 7845, 8011, 8117, 8397, 8357, 8389, 8425, 8461, 8477, 8665, 8817, 8893, 8902, 8922, 8949, 8973, 8979, 9177, 9293, 9539, 9547, 9590, 9641, 9679, 9693, 9885, 10026, 10151, 10185, 10214, 10263, 10341, 10349, 10471, 10553, 10646, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12582, 12619, 12662, 12717, 12755, 12866, 12993, 13150, 13158, 13205, 13217, 13254, 13273, 13445, 13635, 13846, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16588, 16547, 16577, 16613, 16630, 16650, 16750, 16897, 17045, 17061, 17089, 17137, 17173, 17186, 17351, 17485, 17637, 17669, 17695, 17770, 17793, 17829, 17939, 18109, 18246, 18274, 18306, 18341, 18365, 18393, 18566, 18733, 18901, 18931, 18969, 18997, 19049, 19077, 19253, 19445, 19589, 19603, 19653, 19685, 19741, 19789, 20115, 20275, 20293, 20357, 20379, 20437, 20451, 20675, 20781, 20989, 21011, 21050, 21090, 21149, 21155, 21279, 21405, 21537, 21557, 21577, 21603, 21634, 21650, 21789, 21917, 22133, 22154, 22197, 22266, 22323, 22338, 22489, 22651, 22623, 22857, 22914, 22958, 22979, 23019, 23205, 23258, 23361, 23387, 23406, 23441, 23474, 23493, 23685, 23881, 24007, 24041, 24089, 24125, 24149, 24178, 24317, 24486, 24689, 24699, 24739, 24765, 24613, 24827, 25061, 25195, 25331, 25369, 25385, 25430, 25485, 25515, 25649, 25761, 25894, 25926, 25981, 26025, 26089, 26099, 26246, 26390, 26569, 25594, 26621, 26650, 26674, 26699, 26910, 27033, 27241 |
| 16K (178) | 18, 31, 50, 66, 82, 243, 307, 331, 346, 517, 602, 671, 714, 861, 953, 987, 1010, 1157, 1217, 1263, 1290, 1429, 1522, 1563, 1610 1753, 1818, 1851, 1881, 2061, 2133, 2187, 2197, 2301, 2399, 2430, 2450, 2547, 2694, 2763, 2794, 2899, 2973, 3003, 3027 3159, 3267, 3302, 3338, 3497, 3593, 3617, 3645, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5671, 5701, 5723, 5895, 5987, 6025, 6051, 6222, 6291, 6331, 6378, 6497, 6579, 6609, 6637, 6818, 6846, 6963, 7021, 7201, 7303, 7343, 7366, 7525, 7621, 7683, 721, 7895, 7983, 8046, 8090, 8199, 8274, 8307, 8325, 8449, 8531, 8569, 8593, 8743, 8835, 8885, 8915, 9055, 9137, 9171, 9197, 9367, 9466, 9498, 9539, 9723, 9801, 9843, 9885, 10058, 10147, 10190, 10228, 10391, 10506, 10545, 10578, 10703, 10779, 10802, 10825, 10959, 11077 11133, 11169, 11325, 11479, 11510, 11629, 11694, 11721, 11747, 11941, 12021, 12063, 12069, 12243, 12350, 12383, 12414, 12598, 12685, 12715, 12758, 12881, 12963, 13013, 13050, 13195, 13297, 13325, 13349, 13517 |
| 8K (89) | 9, 25, 41, 154, 173, 301, 357, 477, 505, 609, 645, 761, 805, 909, 941, 1067, 1098, 1199, 1225, 1347, 1397, 1487, 1514, 1633, 1669, 1797, 1822, 1925, 2089, 2119, 2226, 2245, 2387, 2423, 2545, 2587, 2667, 2709, 2835, 2861, 2993, 3026, 3146, 3189, 3290, 3318, 3473, 3510, 3651, 3683, 3811, 3861, 3991, 4045, 4137, 4163, 4265, 4297, 4417, 4457, 4569, 4598, 4733, 4769, 4901, 4942 5073, 5113, 5253, 5289, 5389, 5413, 5539, 5585, 5714, 5755, 5847, 5873, 6010, 6045, 6175, 6207, 6342, 6379, 6482, 6525, 6649, 6675 |

Table 6 lists subcarrier indexes indicating positions in the data symbol 450 where the second pilots are inserted according to still another exemplary embodiment. Table 6 shows that the numbers of the inserted second pilots are 356 in case of the 32K FFT size, 178 in case of the 16K FFT size and 89 in case of the 8K FFT size, respectively. These numbers of the inserted second pilots are less than 360 in case of the 32K FFT size, 180 in case of the 16K FFT size and 90 in case of 8K FFT size as defined in Table 3 above.

The second arrangement pattern according to still another exemplary embodiment may further be defined in Table 7. Here, the number of the second pilots indicated by the subcarrier indexes is less than the number of the second pilots defined in Table 6.

TABLE 7

| FFT | CP position |
|---|---|
| 32K (348) Source Index | 163, 290, 486, 605, 614, 635, 662, 685, 691, 658, 1033, 1187, 1203, 1269, 1341, 1379, 1427, 1582, 1721, 1681, 1906, 1925, 1973, 2006, 2019, 2217, 2314, 2425, 2434, 2478, 2526, 2549, 2579, 2709, 2857, 3009, 3043, 3083, 3125, 3173, 3219, 3399, 3508, 3521, 3635, 3674, 3701, 3749, 3762, 3997, 4122, 4257, 4266, 4298, 4333, 4382, 4393, 4539, 4601, 4786, 4797, 4831, 4859, 4881, 4899, 5095, 5293, 5378, 5378, 5473, 5525, 5553, 5587, 5693, 5797, 5937, 5946, 5989, 6005, 6037, 6054, 6139, 6317, 6501, 6533, 6558, 6653, 6654, 6675, 6807, 6994, 7163, 7186, 7213, 7233, 7277, 7289, 7467, 7586, 8689, 7701, 7753, 7790, 7813, 7845, 8011, 8117, 8337, 8357, 8389, 8425, 8461, 8477, 8685, 8817, 8893, 8902, 8922, 8949, 8973, 8979, 9177, 9293, 9539, 9547, 9590, 9641, 9679, 9693, 9885, 10026, 10151, 10185, 10214, 10283, 10341, 10349, 10471, 10553, 10646, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12582, 12619, 12662, 12717, 12755, 12866, 12993, 13150, 13157, 13205, 13217, 13254, 13273, 13445, 13635, 13846, 13891, 13907, 13965, 14002, 14041, 14225, 14402, 14571, 14605, 14537, 14585, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17537, 17659, 17695, 17770, 17793, 17829, 17939, 18109, 18246, 18274, 18306, 18341, 18365, 18393, 18565, 18733, 18981, 18931, 18969, 18997, 19049, 19077, 19253, 19445, 19589, 19603, 19653, 19686, 19741, 19769, 19989, 20115, 20275, 20293, 20357, 20379, 20437, 20451, 20675, 20784, 20989, 21011, 21050, 21090, 21149, 21155, 21279, 21405, 21537, 21557, 21577, 21603, 21634, 21650, 21769, 21917, 22133, 22154, 22197, 22266, 22323, 22333, 22489, 22551, 22823, 22857, 22914, 22958, 22979, 23019, 23205, 23253, 23361, 23387, 23406, 23441, 23474, 23493, 23685, 23881, 24007, 24041, 24069, 24125, 24149, 24178, 24317, 24486, 24539, 24699, 24739, 24765, 24813, 24827, 25061, 25195, 25331, 25369, 25385, 25430, 25485, 25515, 25649, 25761, 25894, 25926, 25981, 26025, 26088, 26099, 26246, 26390, 26569, 26594, 26621, 26650, 26674, 26698, 26910, 27033, 27241 |
| 16K (176) | 82, 243, 307, 331, 346, 517, 602, 671, 714, 861, 953, 987, 1010, 1157, 1217, 1263, 1290, 1429, 1522, 1563, 1610, 1753, 1818, 1881, 2061, 2133, 2167, 2197, 2301, 2399, 2430, 2450, 2547, 2694, 2763, 2794, 2899, 2973, 3003, 3027, 3159, 3267, 3302, 3338, 3497, 3593, 3617, 3645, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5671, 5701, 5723, 5895, 5987, 6025, 6051, 6222, 6291, 6331, 6378, 6497, 6579, 6609, 6637, 6818, 6946, 6983, 7021, 7201, 7303, 7343, 7368, 7525, 7621, 7683, 7721, 7895, 7983, 6046, 8090, 8199, 8274, 8307, 8325, 8449, 8531, 8559, 8593, 8743, 8835, 8885, 8915, 9055, 9137, 9171, 9197, 9367, 9466, 9438, 9539, 9723, 9801, 9843, 9885, 10058, 10147, 10190, 10226, 10391 10506, 10545, 10578, 10703, 10779, 10802, 10825, 10959, 11077, 11133, 11159, 11328, 11429, 11479, 11510, 11629, 11694, 11721, 11747, 11941, 12021, 12063, 12089, 12243, 12350, 12383, 12414, 12598, 12685, 12715, 12756, 12881, 12963, 13013, 13050, 13195, 13297, 13325, 13349, 13517, 13638, 13651 |

TABLE 7-continued

| FFT | CP position |
|---|---|
| 8K (87) | 41, 154, 173, 301, 357, 477, 505, 609, 645, 761, 805, 909, 941, 1067, 1098, 1199, 1225, 1347, 1397, 1487, 1514, 1633, 1669, 1797, 1822, 1925, 1961, 2089, 2119, 2226, 2245, 2387, 2423, 2546, 2587, 2667, 2709, 2835, 2861, 2993, 3026, 3146, 3189, 3290, 3318, 3473, 3510, 3651, 3683, 3811, 3861, 3991, 4045, 4137, 4163, 4265, 4297, 4417, 4457, 4569, 4598, 4733, 4769, 4901, 4942, 5073, 5113, 5253, 5289, 5389, 5413, 5539, 5585, 5714, 5755, 5847, 5873, 6010, 6045, 6175, 6207, 6342, 6379, 6525, 6649, 6675 |

Table 7 lists subcarrier indexes indicating positions in the data symbol 450 where the second pilots are inserted according to still another exemplary embodiment. Table 7 shows that the numbers of the inserted second pilots are 348 in case of the 32K FFT size, 176 in case of the 16K FFT size and 87 in case of the 8K FFT size, respectively. These numbers of the inserted second pilots are less than 356 in case of the 32K FFT size, 178 in case of the 16K FFT size and 89 in case of the 8K FFT size as defined in Table 6 above.

That is, the pilot inserter 120 may insert the first pilots in the preamble symbol 410 according to one of the tables where subcarrier indexes are indicated as defined in Tables 2 and 5. Also, the pilot inserter 120 may insert the second pilots in the data symbol 450 according to one of the tables where subcarrier indexes are indicated as defined in Tables 3, 4, 6 and 7.

Similarly as described with respect to subcarrier indexes defined in Tables 2, 3 and 4, in connection with the subcarrier indexes as defined in Tables 5, 6 and 7, the pilot inserter 120 may determine the insertion positions of the pilots corresponding to 16K and 8K FFT sizes based on the subcarrier indexes of the 32K FFT size. Further, the pilot inserter 120 may simultaneously store information on the subcarrier indexes with respect to all FFT sizes in the storage, when the memory area for storing information on the insertion positions is sufficiently secured. In addition, similarly as previously described above with respect to Tables 2, 3 and 4, the number and the insertion positions of the first and second pilots as defined in Tables 5, 6 and 7 are defined not to overlap with those of the scattered pilots inserted in the data symbol 450. In sum, the subcarrier indexes defined in Tables 5, 6 and 7 may apply the same functions and the description therefor as those with respect to the subcarrier indexes defined in Tables 2, 3 and 4, except that the former tables indicate relatively less number of pilots.

Figure 7:
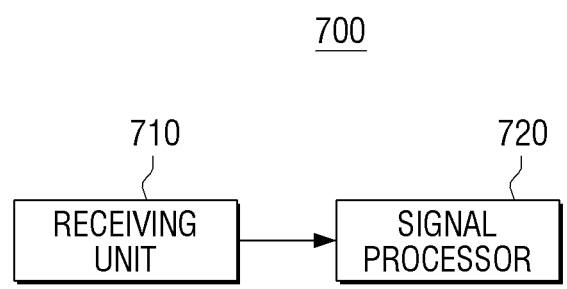
FIG. 7 is a block diagram of illustrating configuration of a receiver, according to an exemplary embodiment.

FIG. 7 is a block diagram of illustrating configurations of a receiver, according to an exemplary embodiment.

Referring to FIG. 7, the receiver 700 includes a receiving unit 710 and a signal processor 720.

The receiving unit 710 may receive a plurality of frames, each of which includes a preamble symbol in which first pilots are inserted in accordance with a first arrangement pattern and a data symbol in which second pilots are inserted in accordance with a second arrangement pattern.

The signal processor 720 may detect the first pilots and the second pilots based on the first arrangement pattern and the second arrangement pattern, respectively, and synchronize the preamble symbol and the data symbols using the detected first pilots and second pilots, respectively. That is, the signal processor 720 may perform rough synchronization using a preamble symbol in the time domain, and then, perform precise synchronization of the preamble symbol and the data symbol using the first and second pilots detected in the frequency domain.

To be specific, according to the DVB-T2, the receiver 700 performs synchronization in time domain by using the P1 symbol, and performs synchronization for the data symbol by adjust timing offsets, sampling offsets and frequency offsets based on continual pilots inserted in the data symbol. To the contrary, the signal processor 720 according to one embodiment may perform the rough synchronization in time domain using the preamble symbol first and then perform precise synchronization based on the first pilot inserted in the preamble symbol, and may perform the rough synchronization of the data symbol in the time domain and then perform the fine synchronization based on the second pilots inserted in the data symbol. Further, the numbers of the first and second pilots are much more than the continual pilots used in the DVB-T2, thereby allowing more precise and faster synchronization.

After performing synchronization, the signal processor 720 may detect data from the data symbol. For instance, the signal processor 720 may perform demodulation, frame de-building, BICM decoding, and input de-processing.

A first arrangement pattern is indicated in a table which shows subcarrier indexes indicating positions in the preamble symbol where the first pilots will be inserted, as shown in Table 2.

A second arrangement pattern is indicated in a table which shows subcarrier indexes indicating positions in the data symbol where the second pilots will be inserted, as shown in Table 3 or 4.

Figure 8:
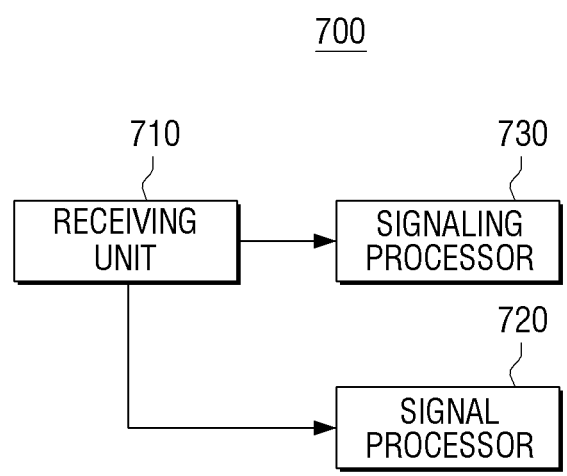
FIG. 8 is a block diagram of illustrating detailed configurations of a receiver, according to an exemplary embodiment.

FIG. 8 is a block diagram of illustrating detailed configurations of the receiver of FIG. 7, according to an exemplary embodiment.

Referring to FIG. 8, the receiver 700 may further include not only the receiver 710 and the signal processor 720 but also a signaling processor 730 for processing signaling information needed to detect data.

The signaling processor 730 may extract the signaling information from a received frame. In particular, the signaling processor 730 may extract and decode an L1 signaling needed to detect data. Detailed explanation on the signaling processor 730 will be provided later.

The signal processor 720 may extract a PLP to decode FEC coding and generate an L2 packet from an error corrected L1 packet based on the L1 signaling provided from the signaling processor 730.

Figure 9:
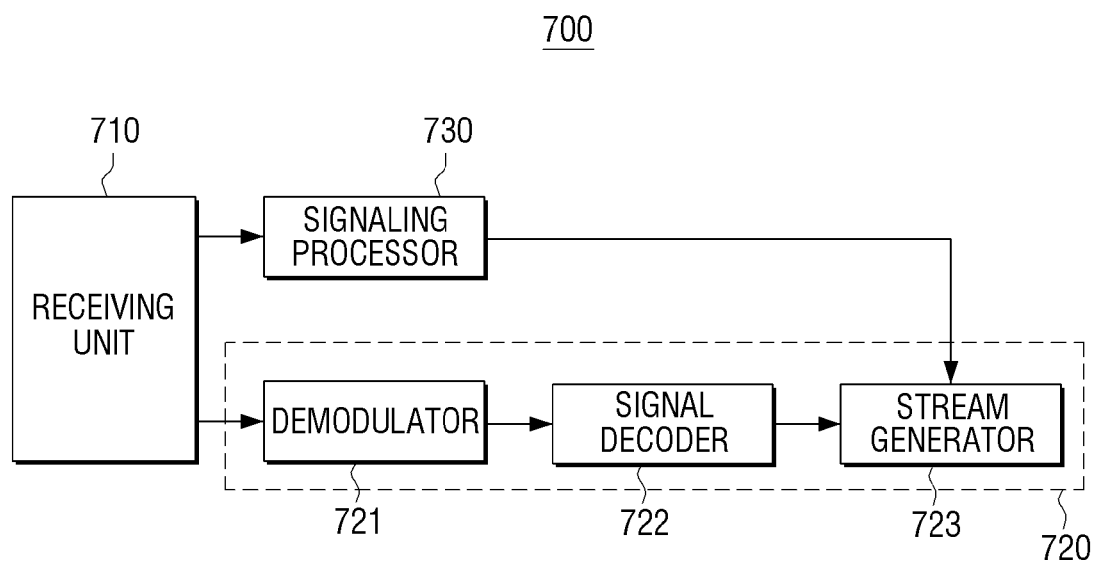
FIG. 9 is a block diagram of illustrating detailed configurations of a signal processor, according to an exemplary embodiment.

FIG. 9 is a block diagram of illustrating configurations of a signal processor, according to an exemplary embodiment.

Referring to FIG. 9, the signal processor 720 includes a demodulator 721, a signal decoder 722 and a stream generator 723.

The demodulator 721 performs demodulation from received RF signals according to an OFDM parameter, performs sync detection, and when a sync is detected, recognizes from information stored in sync regions whether a mobile frame is received or a fixed frame is received.

In case where the OFDM parameter for a signaling region and data region is not predetermined, an OFDM parameter for the signaling region and data region, which is stored in a sync region, is obtained, and then, an OFDM parameter for a signaling region and data region that comes right after the sync region is obtained to perform demodulation.

The decoder 722 performs demodulation on input data. In this case, the signal decoder 722 may use signaling information to obtain parameters stored in each data region with respect to an FEC scheme, a modulation method, etc. and then may perform demodulation. Further, the signal decoder 722 may calculate a starting point of data based on data information included in a configurable post signaling and a dynamic post signaling. That is, it can be calculated to which position the corresponding PLP is transmitted.

The stream generator 723 may process a baseband frame input from the signal decoder 722 to generate data to be serviced.

The stream generator 723 may generate an L2 packet from an error corrected L1 packet based on the L1 signaling provided from the signaling processor 730.

To be specific, the stream generator 723 may include de-jitter buffers, which may in turn regenerate a precise timing for reconstructing an output stream based on the L1 signaling provided from the signaling processing 730. Therefore, delay for synchronizing between a plurality of PLPs may be compensated.

Figure 10:
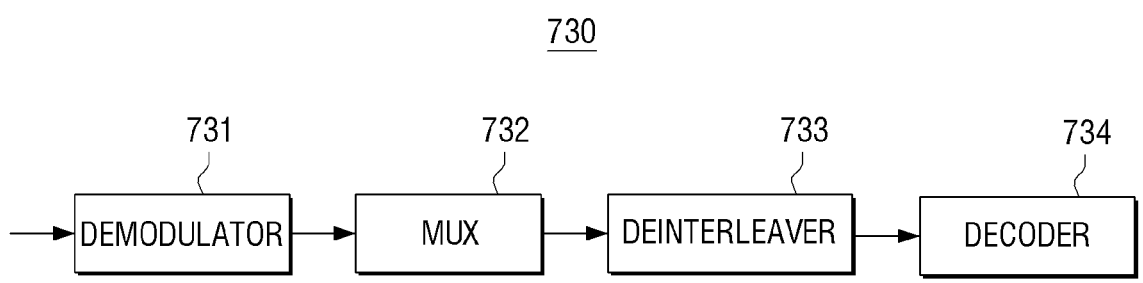
FIG. 10 is a block diagram of illustrating configurations of a signaling processor, according to an exemplary embodiment.

FIG. 10 is a block diagram of illustrating configurations of a signaling processing, according to an exemplary embodiment.

According to FIG. 10, the signaling processor 730 includes a demodulator 731, a Mux 732, a deinterleaver 733 and a decoder 734.

The demodulator 731 receives and demodulates a signal transmitted from the transmitter 100. To be specific, the demodulator 731 demodulates the received signal to generate a value corresponding to a low density parity check (LDPC) codeword and then outputs the generated value through the Mux 732.

In this case, the value corresponding to the LDPC codeword may be indicated as a channel value of a received signal. Herein, there may exist various ways of determining a channel value. For example, a method of determining a channel value may be a method of determining a log likelihood ratio (LLR) value.

Herein, the LLR value may be expressed as a value obtained by taking the logarithm of a rate of a probability where a bit transmitted from the transmitter 100 should be zero (0) to a probability where a bit transmitted from the transmitter 100 should be one (1). Alternately, the LLR value may be a bit value itself determined by a hard decision or and may be a representative value determined depending on any section where covers the probability of the bit transmitted from the transmitter 100 being zero (0) or otherwise the probability thereof being one (1).

The Mux 732 multiplexes an output value of the demodulator 221 and outputs it to a deinterleaver. Herein, the output value of the demodulator 221 is a value corresponding to an LDPC codeword, and may be, for example, an LLR value.

To be specific, the Mux 732, which is a component corresponding to a Demux (not illustrated) included in the transmitter 100, may perform an operation corresponding to a demultiplexing operation performed in the Demux. That is, the Mux 732 performs a parallel-to-serial conversion on a value corresponding to the LDPC codeword outputted from the demodulator 731 and performs multiplexing of the value corresponding to the LDPC codeword.

The deinterleaver 733 deinterleaves the output value of the Mux 732 and outputs it to the decoder 734.

To be specific, the deinterleaver 733, which is a component corresponding to an interleaver included in the transmitter 100, may perform an operation corresponding to an operation performed in the interleaver. That is, the deinterleaver 733 may perform deinterleaving of a value corresponding to the LDPC codeword in a fashion of corresponding to the interleaving operation performed in the interleaver. Here, a value corresponding to the LDPC codeword may be, for example, an LLR value.

The decoder 734 which is a component corresponding to an FEC encoder (not illustrated) included the transmitter 100, may perform an operation corresponding to an operation performed by the FEC encoder. To be specific, the decoder 734 may perform decoding based on the deinterleaved LLR value and may output an L1 signaling.

Figure 11:
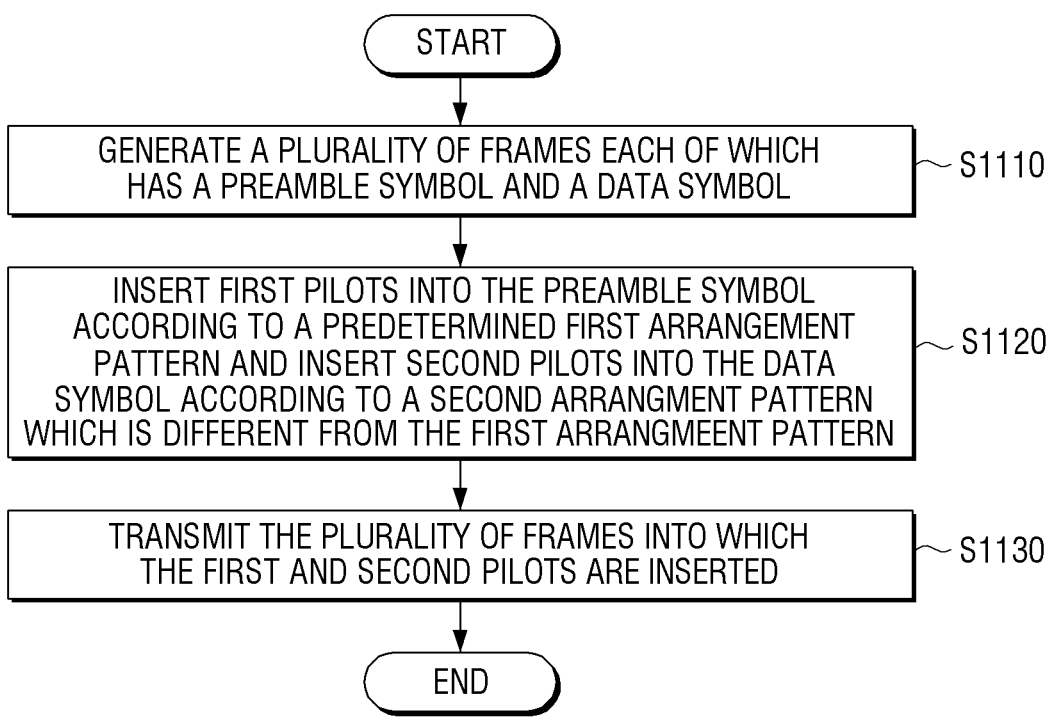
FIG. 11 is a flowchart which is provided to explain a method for controlling a transmitter, according to an exemplary embodiment.

FIG. 11 is a flowchart of explaining a method of controlling a transmitter, according to an exemplary embodiment.

According to the method of controlling the transmitter illustrated in FIG. 11, a plurality of frames is first generated, each frame of which includes a preamble symbol and a data symbol (S1110).

Then, first pilots are inserted in the preamble symbol according to a first arrangement pattern, and second pilots are inserted in the data symbol according to a second arrangement pattern different from the first arrangement pattern (S1120).

Thereafter, the plurality of frames where the first and second pilots are inserted are transmitted (S1130).

Here, in inserting the second pilots in the data symbol, the number and the insertion positions of the second pilots may be modified based on FFT sizes of the data symbol.

The FFT size of the data symbol is one of 8K, 16K and 32K, and the second pilot insertion may be performed by inserting 90 second pilots in the data symbol according to the second arrangement pattern when the FFT size is 8K, inserting 180 second pilots in the data symbol according to the second arrangement pattern when the FFT size is 16K, or inserting 360 second pilots in the data symbol according to the second arrangement pattern when the FFT size is 32K.

The method of controlling the transmitter as illustrated in FIG. 11 may further include storing information on the number and the insertion positions of the second pilots which will be inserted to the data symbol of a first FFT size, which is the largest size among the FFT sizes that the data symbol can have.

When a data symbol of a second FFT size different from the first FFT size is input, the second pilot insertion may be performed by modifying the stored information on the number and the insertion positions of second pilots based on the rate of the first FFT size to the second FFT size and determining the number and the insertion positions of the second pilots which are inserted in the data symbol of the second FFT size.

The first arrangement pattern is indicated by a table showing subcarrier indexes indicating positions in a preamble symbol where the first pilots are inserted, as shown in Table 2 or 5

The second arrangement pattern is indicated by a table showing subcarrier indexes indicating positions in the data symbol where the second pilots are inserted, as shown in Table 3, 4, 6 and 7.

Both of the first and second pilots are continual pilots having the same frequency band. These continual pilots are inserted in a way that they do not overlap with scattered pilots inserted in the preamble symbol and data symbols.

Figure 12:
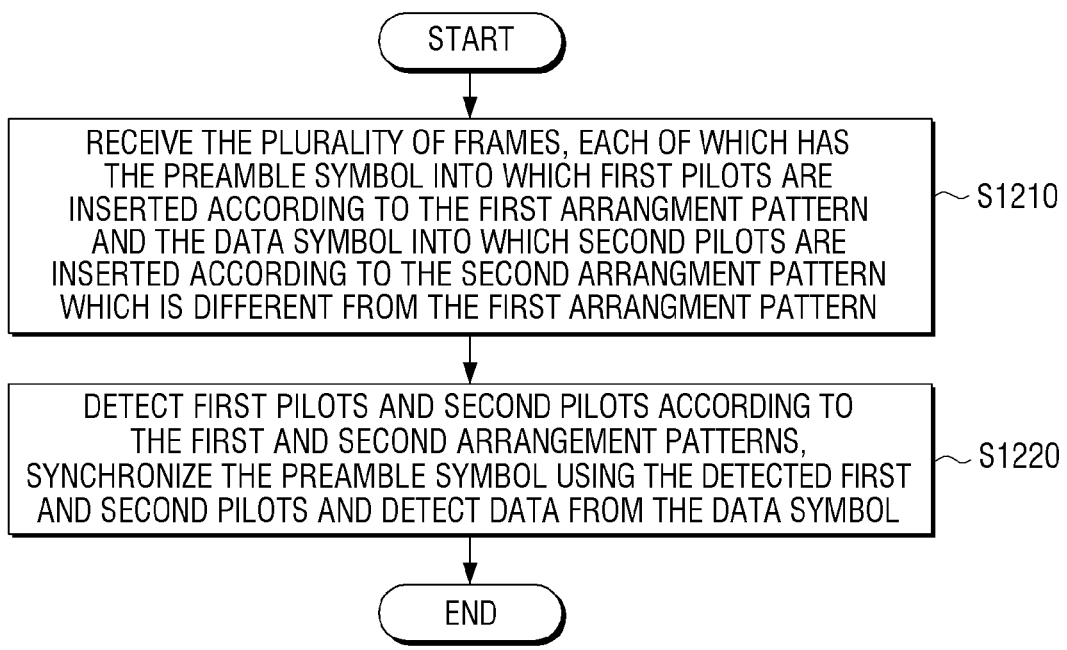
FIG. 12 is a flowchart which is provided to explain a method for controlling a receiver, according to an exemplary embodiment.

FIG. 12 is a flowchart of explaining a method of controlling a receiver, according to an exemplary embodiment.

According to a method of controlling a receiver illustrated in FIG. 12, a plurality of frames are received, each frame of which includes a preamble symbol in which first pilots are inserted in accordance with a first arrangement pattern and a data symbol in which second pilots are inserted in accordance with a second arrangement pattern different from the first arrangement pattern (S1210).

Then, the first and second pilots are detected based on the first and second arrangement pattern, respectively, the preamble symbol and the data symbol are synchronized using the detected first and second pilots and data can be detected from the data symbols, respectively (S1220).

The first arrangement pattern is indicated by a table showing subcarrier indexes indicating positions in a preamble symbol where the first pilots are inserted, as shown in Table 2 or 5.

The second arrangement pattern is indicated by a table showing subcarrier indexes indicating positions in the data symbol where the second pilots are inserted, as shown in Table 3, 4, 6 and 7.

As shown above, according to various exemplary embodiments, a memory needed to store information about pilots may be reduced and precise synchronization may be performed based on an increased number of pilots.

Meanwhile, a non-transitory computer readable medium may be provided which stores a program sequentially carrying out the controlling method according to the above embodiments.

For example, a non-transitory computer readable medium storing thereon a program may be provided, which carries out generating a plurality of frames, each of which includes a preamble symbol and a data symbol, and inserting first pilots in the preamble symbol according to a first arrangement pattern and inserting second pilots in the data symbol according to a second arrangement pattern.

By way of illustrating an example, a non-transitory computer readable medium storing thereon a program may be provided, which carries out detecting the first and second pilots respectively based on the first and second arrangement patterns, synchronizing the preamble symbol and the data symbol using the detected first and second pilots respectively, and detecting data can from the data symbol.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as compact disk (CD), digital versatile disk (DVD), hard disk, Blu-ray disk, universal serial bus (USB), memory card, and read-only memory (ROM).

Components, elements or units represented by a block as illustrated in FIGS. 1, 2 and 7-10 may be embodied as the various numbers of hardware, software and/or firmware structures that execute respective functions described above, according to exemplary embodiments. For example, these components, elements or units may use a direct circuit structure, such as a memory, processing, logic, a look-up table, etc. that may execute the respective functions through controls of one or more microprocessors or other control apparatuses. These components, elements or units may be specifically embodied by a module, a program, or a part of code, which contains one or more executable instructions for performing specified logic functions. Also, at least one of the above components, elements or units may further include a processor such as a central processing unit (CPU) that performs the respective functions, a microprocessor, or the like. A bus is not illustrated in the above drawings which illustrate a transmitter and a receiver. However, communication between respective components, elements or units in the transmitter and the receiver may be carried out through the bus.

The foregoing embodiments and advantages are merely exemplary and should not be construed as limiting the inventive concept. Also, the description of the exemplary embodiments of the inventive concept is intended to be illustrative, and not to limit the scope of the claims, and many alternatives, modifications, and variations will be apparent to those skilled in the art.

What is claimed is:

1. A transmitter comprising:
   a frame generator configured to generate a plurality of frames each of which comprises a preamble symbol and a data symbol;
   a pilot inserter configured to insert a plurality of first pilots in the preamble symbol of a frame according to a first arrangement pattern and insert a plurality of second pilots in the data symbol of the frame according to a second arrangement pattern; and
   a transmitting unit configured to transmit the plurality of frames in which the first pilots and the second pilots are inserted.

2. The transmitter of claim 1, wherein the pilot inserter determines a number and insertion positions of the second pilots in the data symbol based on a fast Fourier transform (FFT) size of the data symbol.

3. The transmitter of claim 2, wherein the FFT size of the data symbol is one of 8K, 16K and 32K,
   wherein, in case of the FFT size being 8K, the pilot inserter inserts 90 second pilots according to the second arrangement pattern,
   wherein, in case of the FFT size being 16K, the pilot inserter inserts 180 second pilots according to the second arrangement pattern, and
   wherein, in case of the FFT size being 32K, the pilot inserter inserts 360 second pilots according to the second arrangement pattern.

4. The transmitter of claim 2,
   wherein the pilot inserter is further configured to store information on a number and insertion positions of second pilots in a data symbol of a predetermined FFT size,
   wherein, in response to input of a data symbol, having an FFT size which is different from the predetermined FFT size, to the frame generator, the pilot inserter determines a number and insertion positions of second pilots in the input data symbol by modifying the stored information based on a rate of the predetermined FFT size to the different FFT size,
   wherein the predetermined FFT size is the largest FFT size that the input data symbol can have.

5. The transmitter of claim 1, wherein the first arrangement pattern is indicated in a following table showing subcarrier indexes corresponding to positions of the first pilots in the preamble symbol:

| FFT | CP position |
|---|---|
| 8K (45) | 41, 173, 357, 505, 645, 805, 941, 1098, 1225, 1397, 1514, 1669, 1822, 1961, 2119, 2245, 2423, 2587, 2709, 2861, 3026, 3189, 3318, 3510, 3683, 3861, 4045, 4163, 4297, 4457, 4598, 4769, 4942, 5113, 5289, 5413, 5585, 5755, 5873, 6045, 6207, 6379, 6525, 6675, 6862. |

6. The transmitter of claim 1, wherein the second arrangement pattern is indicated in a following table showing subcarrier indexes corresponding to positions of the second pilots in the data symbol:

| FFT | CP position |
| --- | --- |
| 32K (360) Source Index | 35, 45, 61, 82, 99, 117, 131, 147, 183, 290, 486, 605, 614, 635, 652, 685, 691, 858, 1033, 1187, 1203, 1269, 1341, 1379, 1427, 1582, 1721, 1881, 1906, 1973, 2006, 2819, 2217, 2314, 2425, 2434, 2478, 2526, 2549, 2579, 2709, 2857, 3009, 3043, 3063, 3125, 3173, 3219, 3399, 3506, 3621, 3635, 3674, 3701, 3749, 3762, 3997, 4122, 4257, 4266, 4298, 4333, 4382, 4393, 4539, 4601, 4786, 4797, 4831, 4859, 4881, 4899, 5095, 5393, 5378, 5387, 5473, 5525, 5553, 5587, 5693, 5797, 5937, 5946, 5969, 6005, 6937, 6054, 6139, 6317, 6533, 6558, 6603, 6654, 6675, 6807, 6994, 7153, 7186, 7213, 7233, 7277, 7289, 7467, 7586, 7689, 7701, 7753, 7790, 7813, 7846, 8011, 8117, 8337, 8357, 8389, 8425, 8461, 8477, 8665, 8817, 8893, 8902, 8922, 8949, 8973, 8979, 9177, 9293, 9539, 9547, 9590, 9641, 9679, 9693, 9885, 10026, 10185, 10214, 10283, 10341, 10349, 10471, 10553, 10656, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12582, 12649, 12552, 12717, 12755, 12866, 12993, 13150, 13158, 13205, 13217, 13264, 13173, 13445, 13635, 13846, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17637, 17669, 17695, 17770, 17793, 17829, 17939, 18109, 15246, 18274, 18306, 18341, 18365, 18393, 18566, 18733, 18901, 18931, 18969, 18997, 19049, 19077, 19253, 19445, 19589, 19603, 19653, 19686, 19741, 19759, 19989, 20115, 20275, 20293, 220357, 20379, 20437, 20451, 20675, 20781, 20989, 21011, 21050, 21090, 21149, 21155, 21279, 21505, 21537, 21557, 21577, 21603, 21634, 21650, 21789, 21917, 22133, 22154, 22197, 22265, 22323, 22338, 22489, 22651, 22823, 22857, 22314, 22953, 22979, 23019, 23205, 23258, 23361, 23387, 23406, 23441, 23474, 23494, 23685, 23771, 24007, 24041, 24069, 24125, 24149, 24178, 24317, 24466, 24689, 24699, 24739, 24765, 24813, 24827, 25061, 25195, 25331, 25369, 25385, 25430, 25465, 25515, 25649, 25761, 25694, 25926, 25981, 26025, 26089, 26099, 26246, 26390, 26569, 26594, 26621, 26660, 26674, 26698, 26910, 27033, 27241, 27449, 27511, 27642, 27801 |
| 16K (180) | 18, 31, 50, 65, 82, 246, 307, 331, 346, 517, 602, 671, 714, 861, 953, 987, 1010, 1157, 1217, 1263, 1290, 1429, 1522, 1563, 1610 1753, 1818, 1851, 1881, 2061, 2133, 2167, 2197, 2301, 2399, 2430, 2450, 2647, 2694, 2763, 2794, 2899, 2973, 3003, 3027 3159, 3287, 3302, 3338, 3497, 3593, 3817, 3845, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5671, 5701, 5723, 5895, 5967, 6025, 6051, 6222, 6291, 6331, 6378, 6497, 6579, 6608, 6637, 6818, 6946, 6983, 7021, 7303, 7343, 7366, 7525, 7621, 7683, 7721, 7895, 7983, 8046, 8090, 8199, 8274, 8307, 8325, 8449, 8531, 8559, 8593, 8743, 8835, 8885, 8915, 9055, 9137, 9171, 9197, 9367, 9466, 9493, 9539, 9723, 9881, 9843, 9885, 10059, 10147, 10190, 10226, 10391, 10596, 10545, 10578, 10703, 10703, 10779, 10802, 10825, 10959, 11077 11133, 11169, 11326, 11429, 11479, 11510, 11629, 11694, 11721, 11747, 11941, 12021, 12063, 12089, 12243, 12350, 12383, 12414, 12598, 12685, 12715, 12758, 12881, 12963, 13013, 13195, 13297, 13325, 13349, 13517, 13725, 13821 |
| 8K (90) | 9, 25, 41, 154, 173, 301, 357, 477, 505, 609, 645, 761, 805, 909, 941, 1067, 1098, 1199, 1225, 1347, 1397, 1497, 1514, 1633, 1669, 1797, 1822, 1925, 1961, 2089, 2119, 2228, 2246, 2387, 2423, 2546, 2597, 2667, 2709, 2835, 2861, 2993, 3026, 3148, 3189, 3290, 3318, 3473, 3510, 3651, 3683, 3811, 3861, 3991, 4045, 4137, 4163, 4265, 4297, 4417, 4457, 4569, 4598, 4733, 4769, 4901, 4942 5073, 5113, 5253, 5289, 5389, 5413, 5539, 5585, 5714, 5755, 5847, 5371, 6010, 6045, 6175, 6207, 6345, 6379, 6482, 6525, 6649, 6675, 6862 |

7. The transmitter of claim 1, wherein the second arrangement pattern is indicated in a following table showing subcarrier indexes corresponding to positions of the second pilots in the data symbol:

| FFT | CP position |
| --- | --- |
| 32K (380) Source Index | 163, 290, 466, 605, 614, 635, 662, 685, 691, 858, 1033, 1187, 1203, 1269, 1341, 1379, 1427, 1582, 1721, 1861, 1906, 1925, 1973, 2006, 2019, 2217, 2314, 2425, 2434, 2478, 2526, 2549, 2579, 2709, 2857, 3009, 3043, 3083, 3125, 3173, 3219, 3399, 3506, 3621, 3635, 3674, 3701, 3749, 3762, 3997, 4122, 4257, 4266, 4298, 4333, 4382, 4393, 4539, 4601, 4786, 4797, 4831, 4859, 4891, 4899, 5095, 5293, 5378, 5387, 5473, 5525, 5553, 5587, 5693, 5797, 5937, 5946, 5989, 6005, 6037, 6054, 6139, 6317, 6501, 6533, 6558, 6603, 6654, 6675, 6807, 6994, 7163, 7185, 7213, 7233, 7277, 7289, 7487, 7586, 7669, 7701, 7753, 7790, 7813, 7845, 8011, 8117, 8337, 8357, 8389, 8425, 8461, 8477, 8565, 8817, 6993, 8902, 8922, 8973, 8979, 9177, 9293, 9539, 9547, 9590, 9641, 9679, 9693, 9885, 10026, 13151, 10185, 10214, 10283, 10341, 10349, 10471, 10553, 10646, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12592, 12619, 12668, 12717, 12755, 12856, 12993, 13150, 13158, 13205, 13217, 13254, 13273, 13445, 13635, 13648, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17637, 17669, 17695, 17770, 17793, 17939, 18109, 18246, 18274, 18806, 18341, 18365, 18393, 18566, 18733, 18901, 18931, 18969, 18997, 19049, 19077, 19253, 19445, 19589, 19603, 19653, 19686, 19741, 19769, 19989, 20115, 20275, 20293, 20357, 20379, 20437, 20451, 20675, 20781, 20989, 21011, 21050, 21090, 21149, 21155, 21279, 21405, 21537, 21557, 21577, 21603, 21634, 21650, 21789, 21917, 22133, 22154, 22197, 22266, 22323, 22338, 22469, 22651, 22823, 22857, 22914, 22958, 22979, 23019, 23205, 23258, 23361, 23387, 232406, 23441, 23474, 23493, 23685, 236881, 24007, 24941, 24069, 24125, 24149, 24176, 24317, 24486, 24669, 24699, 24733, 24765, 24913, 24627, 25061, 25195, 25331, 25389, 25365, 25430, 25485, 25515, 25649, 25761, 25894, 25926, 25981, 26025, 26089, 26099, 26246, 26390, 26509, 26594, 26621, 26650, 26674, 26698, 26910, 27033, 27241, 27275, 27285, 27301, 27322, 27339, 27357, 27371, 27387, 27445, 27511, 27642, 27801 |
| 16K (180) | 82, 243, 307, 331, 346, 517, 602, 671, 714, 861, 953, 987, 1010, 1157, 1217, 1263, 1290, 1429, 1522, 1563, 1610, 1753, 1818, 1851, 1881, 2061, 2133, 2167, 2197, 2301, 2399, 2430, 2450, 2647, 2694, 2763, 2794, 2899, 2973, 3003, 3027, 3158, 3267, 3302, 3338, 3497, 3593, 3617, 3645, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5674, 5701, 5723, 5895, 5997, 6026, 6051, 6222, 6291, 6331, 6376, 6497, 6579, 6609, 6637, 6818, 6946, 6983, 7021, 7201, 7303, 7343, 7356, 7525, 7621, 7693, 7721, 7895, 7983, 8046, 8090, 8199, 8274, 8907, 8925, 8449, 8531, 8539, 8593, 8743, 8835, 8885, 8915, 9055, 9137, 9171, 9197, 9367, 9468, 9539, 9723, 9801, 9846, 9885, 10058, 10147, 10190, 10226, 10391, 10506, 15045, 10578, 10703, 10779, 10802, 10825, 10959, 11077, 11138, 11169, 11326, 11429, 11479, 11510, 11629, 11694, 11721, 11747, 11941, 12021, 12053, 12089, 12253, 12350, 12383, 12414, 12598, 12685, 12715, 12758, 12891, 12963, 13013, 13050, 13195, 13297, 13325, 13349, 13517, 13536, 13651, 13670, 13686, 13725, 13921 |
| 8K (90) | 41, 154, 173, 301, 357, 477, 505, 609, 645, 761, 805, 909, 941, 1067, 1098, 1199, 1225, 1347, 1397, 1487, 1514, 1633, 1669, 1797, 1822, 1925, 1961, 2089, 2119, 2226, 2245, 2387, 2423, 2546, 2587, 2667, 2709, 2835, 2861, 2993, 3026, 3146, 3189, 3290, 3319, 3473, 3510, 3651, 3683, 3811, 3861, 3991, 4045, 4137, 4163, 4265, 4297, 4417, 4457, 4569, 4598, 4733, 4769, 4901, 4942, 5073, 5113, 5253, 5289, 5389, 5413, 5539, 5585, 5714, 5755, 5847, 5873, 6010, 6045, 6175, 6207, 6342, 6379, 6492, 6525, 6649, 6675, 6819, 6835, 6862. |

8. The transmitter of claim 1, wherein the first arrangement pattern is indicated in a following table showing subcarrier indexes corresponding to positions of the first pilots in the preamble symbol:

| FFT | CP position |
|---|---|
| 8K (44) | 41, 173, 357, 505, 645, 805, 941, 1098, 1225, 1397, 1514, 1669, 1822, 1961, 2118, 2245, 2423, 2587, 2709, 2861, 3026, 3189, 3318, 3510, 3683, 3861, 4045, 4163, 4297, 4457, 4598, 4769, |

-continued

| FFT | CP position |
|---|---|
| | 4942, 5113, 5289, 5413, 5585, 5755, 5873, 6045, 6207, 6379, 6525, 6675. |

9. The transmitter of claim 1, wherein the second arrangement pattern is indicated in a following table showing subcarrier indexes corresponding to positions of the second pilots in the data symbol:

| FFT | CP position |
|---|---|
| 32K (356) Source Index | 35, 45, 61, 82, 99, 117, 131, 147, 163, 290, 486, 605, 614, 635, 662, 685, 691, 858, 1033, 1187, 1203, 1269, 1341, 1379, 1427, 1582, 1721, 1881, 1906, 1925, 1973, 2006, 2019, 2217, 2314, 2425, 2434, 2478, 2526, 2549, 2579, 2709, 2857, 3009, 3043, 3083, 3125, 3173, 3219, 3399, 3506, 3621, 3635, 3674, 3701, 3749, 3762, 3997, 4122, 4257, 4266, 4298, 4333, 4382, 4393, 4539, 4601, 4786, 4797, 4831, 4859, 4881, 4899, 5095, 5293, 5378, 5389, 5473, 5525, 5553, 5587, 5693, 5797, 5937, 5946, 5989, 6005, 6037, 6054, 6139, 6317, 6501, 6533, 6556, 6603, 6654, 6675, 6807, 6994, 7163, 7186, 7213, 7233, 7277, 7289, 7467, 7586, 7689, 7701, 7753, 7790, 7813, 7845, 8011, 8117, 8337, 8357, 8389, 8425, 8461, 8477, 8665, 8817, 8893, 8902, 8949, 8973, 8979, 9177, 9299, 9539, 9547, 9590, 9641, 9641, 9679, 9693, 9885, 10026, 10151, 10185, 10214, 10283, 10341, 10349, 10471, 10553, 10656, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12582, 12649, 12552, 12717, 12755, 12866, 12993, 13150, 13158, 13205, 13217, 13264, 13173, 13445, 13635, 13846, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17637, 17669, 17695, 17770, 17793, 17829, 17939, 18109, 15246, 18274, 18306, 18341, 18365, 18393, 18566, 18733, 18901, 18931, 18969, 18997, 19049, 19077, 19253, 19445, 19589, 19603, 19653, 19686, 19741, 19759, 19989, 20115, 20275, 20293, 220357, 20379, 20437, 20451, 20675, 20781, 20989, 21011, 21050, 21090, 21149, 21155, 21279, 21505, 21537, 21557, 21603, 21634, 21650, 21789, 21917, 22133, 22154, 22197, 22265, 22323, 22338, 22489, 22651, 22823, 22857, 22314, 22953, 22979, 23019, 23205, 23258, 23361, 23387, 23406, 23441, 23474, 23493, 23685, 23771, 24007, 24041, 24069, 24125, 24149, 24178, 24317, 24466, 24689, 24699, 24739, 24765, 24813, 24827, 25061, 25195, 25331, 25369, 25385, 25430, 25465, 25515, 25649, 25761, 25694, 25926, 25981, 26025, 26089, 26099, 26246, 26390, 26569, 26594, 26621, 26660, 26674, 26698, 26910, 27033, 27241 |
| 16K (178) | 18, 31, 50, 65, 82, 246, 307, 331, 346, 517, 602, 671, 714, 861, 953, 987, 1010, 1157, 1217, 1263, 1290, 1429, 1522, 1563, 1610 1753, 1818, 1851, 1881, 2061, 2133, 2167, 2197, 2301, 2399, 2430, 2450, 2647, 2694, 2763, 2794, 2899, 2973, 3003, 3027 3159, 3287, 3302, 3338, 3497, 3593, 3817, 3845, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5671, 5701, 5723, 5895, 5967, 6025, 6051, 6222, 6291, 6331, 6378, 6497, 6579, 6608, 6637, 6818, 6946, 6983, 7021, 7303, 7343, 7366, 7525, 7621, 7683, 7721, 7895, 7983, 8046, 8090, 8199, 8274, 8307, 8325, 8449, 8531, 8559, 8593, 8743, 8835, 8885, 8915, 9055, 9137, 9171, 9197, 9367, 9466, 9493, 9539, 9723, 9881, 9843, 9885, 10059, 10147, 10190, 10226, 10391, 10596, 10545, 10578, 10703, 10703, 10779, 10802, 10825, 10959, 11077 11133, 11169, 11326, 11429, 11479, 11510, 11629, 11694, 11721, 11747, 11941, 12021, 12063, 12089, 12243, 12350, 12383, 12414, 12598, 12685, 12715, 12758, 12881, 12963, 13013, 13060, 13195, 13297, 13325, 13349, 13517 |
| 8K (89) | 9, 25, 41, 154, 173, 301, 357, 477, 505, 609, 645, 761, 805, 909, 941, 1067, 1098, 1199, 1225, 1347, 1397, 1497, 1514, 1633, 1669, 1797, 1822, 1925, 1961, 2089, 2119, 2228, 2246, 2387, 2423, 2546, 2597, 2667, 2709, 2835, 2861, 2993, 3026, 3148, 3189, 3290, 3318, 3473, 3510, 3651, 3683, 3811, 3861, 3991, 4045, 4137, 4163, 4265, 4297, 4417, 4457, 4569, 4598, 4733, 4769, 4901, 4942 5073, 5113, 5253, 5289, 5389, 5413, 5539, 5585, 5714, 5755, 5847, 5371, 6010, 6045, 6175, 6207, 6345, 6379, 6482, 6525, 6649, 6675. |

10. The transmitter of claim 1, wherein the second arrangement pattern is indicated in a following table showing subcarrier indexes corresponding to positions of the second pilots in the data symbol:

| FFT | CP position |
|---|---|
| 32K (348) Source Index | 163, 290, 466, 605, 614, 635, 662, 685, 691, 858, 1033, 1187, 1203, 1269, 1341, 1379, 1427, 1582, 1721, 1861, 1906, 1925, 1973, 2006, 2019, 2217, 2314, 2425, 2434, 2478, 2526, 2549, 2579, 270*, 2857, 3009, 3043, 3083, 3125, 3173, 3219, 3399, 3506, 3621, 3635, 3674, 3701, 3749, 3762, 3997, 4122, 4257, 4266, 4298, 4333, 4382, 4393, 4539, 4601, 4786, 4797, 4831, 4859, 4891, 4899, 5095, 5293, 5378, 5387, 5473, 5525, 5553, 5587, 5693, 5797, 5937, 5946, 5989, 6005, 6037, 6054, 6139, 6317, 6501, 6533, 6558, 6603, 6654, 6675, 6807, 6994, 7163, 7185, 7213, 7233, 7277, 7289, 7487, 7586, 7669, 7701, 7753, 7790, 7813, 7845, 8011, 8117, 8337, 8357, 8389, 8425, 8461, 8477, 8565, 8817, 6993, 8902, 8922, 8973, 8979, 9177, 9293, 9539, 9547, 9590, 9641, 9679, 9693, 9885, 10026, 13151, 10185, 10214, 10283, 10341, 10349, 10471, 10553, 10646, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12592, 12619, 12668, 12717, 12755, 12856, 12993, 13150, 13158, 13205, 13217, 13254, 13273, 13445, 13635, 13648, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17637, 17669, 17695, 17770, 17793, 17829, 17939, 18109, 18246, 18274, 18806, 18341, 18365, 18393, 18566, 18733, 18901, 18931, 18969, 18997, 19049, 19077, 19253, 19445, 19589, 19603, 19653, 19686, 19741, 19769, 19989, 20115, 20275, 20293, 20357, 20379, 20437, 20451, 20675, 20781, 20989, 21011, 21050, 21090, 21149, 21155, 21279, 21405, 21537, 21557, 21577, 21603, 21634, 21650, 21789, 21917, 22133, 22154, 22197, 22266, 22323, 22338, 22469, 22651, 22823, 22857, 22914, 22958, 22979, 23019, 23205, 23258, 23361, 23387, 232406, 23441, 23474, 23493, 23685, 236881, 24007, 24941, 24069, 24125, 24149, 24176, 24317, 24486, 24669, 24699, 24733, 24765, 24913, 24627, 25061, 25195, 25331, 25389, 25365, 25430, 25485, 25515, 25649, 25761, 25894, 25926, 25981, 26025, 26089, 26099, 26246, 26390, 26509, 26594, 26621, 26650, 26674, 26698, 26910, 27033, 27241 |

| FFT | CP position |
|---|---|
| 16K (176) | 82, 243, 307, 331, 346, 517, 602, 671, 714, 861, 953, 987, 1010, 1157, 1217, 1263, 1290, 1429, 1522, 1563, 1610, 1753, 1818, 1851, 1881, 2061, 2133, 2167, 2197, 2301, 2399, 2430, 2450, 2647, 2694, 2763, 2794, 2899, 2973, 3003, 3027, 3158, 3267, 3302, 3338, 3497, 3593, 3617, 3645, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5674, 5701, 5723, 5895, 5997, 6026, 6051, 6222, 6291, 6331, 6376, 6497, 6579, 6609, 6637, 6818, 6946, 6983, 7021, 7201, 7303, 7343, 7356, 7525, 7621, 7693, 7721, 7895, 7983, 8046, 8090, 8199, 8274, 8907, 8925, 8449, 8531, 8539, 8593, 8743, 8835, 8885, 8915, 9055, 9137, 9171, 9197, 9367, 9468, 9539, 9723, 9801, 9846, 9885, 10058, 10147, 10190, 10226, 10391, 10506, 15045, 10578, 10703, 10779, 10802, 10825, 10959, 11077, 11138, 11169, 11326, 11429, 11479, 11510, 11629, 11694, 11721, 11747, 11941, 12021, 12053, 12089, 12253, 12350, 12383, 12414, 12598, 12685, 12715, 12758, 12891, 12963, 13013, 13050, 13195, 13297, 13325, 13349, 13517, 13536, 13651 |
| 8K (87) | 41, 154, 173, 301, 357, 477, 505, 609, 645, 761, 805, 909, 941, 1067, 1098, 1199, 1225, 1347, 1397, 1487, 1514, 1633, 1669, 1797, 1822, 1925, 1961, 2089, 2119, 2226, 2245, 2387, 2423, 2546, 2587, 2667, 2709, 2835, 2861, 2993, 3026, 3146, 3189, 3290, 3319, 3473, 3510, 3651, 3683, 3811, 3861, 3991, 4045, 4137, 4163, 4265, 4297, 4417, 4457, 4569, 4598, 4733, 4769, 4901, 4942, 5073, 5113, 5253, 5289, 5389, 5413, 5539, 5585, 5714, 5755, 5847, 5873, 6010, 6045, 6175, 6207, 6342, 6379, 6492, 6525, 6649, 6675. |

11. The transmitter of claim 1, wherein both of the first pilots and the second pilots are continual pilots having the same frequency band; and
wherein the pilot inserter inserts the continual pilots not to overlap with a scattered pilot inserted in the data symbol.

12. A receiver comprising:
a receiving unit configured to receive a plurality of frames, each of which comprises a preamble symbol in which a plurality of first pilots are inserted according to a first arrangement pattern and a data symbol in which a plurality of second pilots are inserted according to a second arrangement pattern; and
a signal processor configured to detect the first pilots and the second pilots respectively based on the first arrangement pattern and the second arrangement pattern, synchronize the preamble symbol of a frame and the data symbol of the frame respectively using the detected first pilots and second pilots, and detect data from the data symbol.

13. The receiver of claim 12, wherein the first arrangement pattern is indicated in a following table showing subcarrier indexes corresponding to positions of the first pilots in the preamble symbol:

| FFT | CP position |
|---|---|
| 8K (45) | 41, 173, 357, 505, 645, 805, 941, 1098, 1225, 1397, 1514, 1669, 1822, 1961, 2119, 2245, 2423, 2587, 2709, 2861, 3026, 3189, 3318, 3510, 3683, 3861, 4045, 4163, 4297, 4457, 4598, 4769, 4942, 5113, 5289, 5413, 5585, 5755, 5873, 6045, 6207, 6379, 6525, 6675, 6862. |

14. The receiver of claim 13, wherein the second arrangement pattern is indicated in a following table showing subcarrier indexes corresponding to positions of the second pilots in the data symbol:

| FFT | CP position |
|---|---|
| 32K (360) Source Index | 35, 45, 61, 82, 99, 117, 131, 147, 163, 290, 486, 605, 614, 635, 662, 685, 691, 858, 1033, 1187, 1203, 1269, 1341, 1379, 1427, 1582, 1721, 1881, 1906, 1925, 1973, 2006, 2019, 2217, 2314, 2425, 2434, 2478, 2526, 2549, 2579, 2709, 2857, 3009, 3043, 3083, 3125, 3173, 3219, 3399, 3506, 3621, 3635, 3674, 3701, 3749, 3762, 3997, 4122, 4257, 4266, 4298, 4333, 4382, 4393, 4539, 4601, 4786, 4797, 4831, 4859, 4881, 4899, 5095, 5293, 5378, 5389, 5473, 5525, 5553, 5587, 5693, 5797, 5937, 5946, 5989, 6005, 6037, 6054, 6139, 6317, 6501, 6533, 6556, 6603, 6654, 6675, 6807, 6994, 7163, 7186, 7213, 7233, 7277, 7289, 7467, 7586, 7689, 7701, 7753, 7790, 7813, 7845, 8011, 8117, 8337, 8357, 8389, 8425, 8461, 8477, 8665, 8817, 8893, 8902, 8949, 8973, 8979, 9177, 9299, 9539, 9547, 9590, 9641, 9641, 9679, 9693, 9885, 10026, 10151, 10185, 10214, 10283, 10341, 10349, 10471, 10553, 10656, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12582, 12649, 12552, 12717, 12755, 12866, 12993, 13150, 13158, 13205, 13217, 13264, 13173, 13445, 13635, 13846, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17637, 17669, 17695, 17770, 17793, 17829, 17939, 18109, 15246, 18274, 18306, 18341, 18365, 18393, 18566, 18733, 18901, 18931, 18969, 18997, 19049, 19077, 19253, 19445, 19589, 19603, 19653, 19686, 19741, 19759, 19989, 20115, 20275, 20293, 220357, 20379, 20437, 20451, 20675, 20781, 20989, 21011, 21050, 21090, 21149, 21155, 21279, 21505, 21537, 21557, 21577, 21603, 21634, 21650, 21789, 21917, 22133, 22154, 22197, 22265, 22323, 22338, 22489, 22651, 22823, 22857, 22314, 22953, 22979, 23019, 23205, 23258, 23361, 23387, 23406, 23441, 23474, 23493, 23685, 23771, 24007, 24041, 24069, 24125, 24149, 24178, 24317, 24466, 24689, 24699, 24739, 24765, 24813, 24827, 25061, 25195, 25331, 25369, 25385, 25430, 25465, 25515, 25649, 25761, 25694, 25926, 25981, 26025, 26089, 26099, 26246, 26390, 26569, 26594, 26621, 26660, 26674, 26698, 26910, 27033, 27241, 27244, 27277, 27511, 27642, 27801 |
| 16K (180) | 18, 31, 50, 65, 82, 246, 307, 331, 346, 517, 602, 671, 714, 861, 953, 987, 1010, 1157, 1217, 1263, 1290, 1429, 1522, 1563, 1610 1753, 1818, 1851, 1881, 2061, 2133, 2167, 2197, 2301, 2399, 2430, 2450, 2647, 2694, 2763, 2794, 2899, 2973, 3003, 3027 3159, 3287, 3302, 3338, 3497, 3593, 3817, 3845, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5671, 5701, 5723, 5895, 5967, 6025, 6051, 6222, 6291, 6331, 6378, 6497, 6579, 6608, 6637, 6818, 6946, 6983, 7021, 7303, 7343, 7366, 7525, 7621, 7683, 7721, 7895, 7983, 8046, 8090, 8199, 8274, 8307, 8325, 8449, 8531, 8559, 8593, 8743, 8835, 8885, 8915, 9055, 9137, 9171, 9197, 9367, 9466, 9493, 9539, 9723, 9881, 9843, 9885, 10059, 10147, 10190, 10226, 10391, 10596, 10545, 10578, 10703, 10703, 10779, 10802, 10825, 10959, 11077 11133, 11169, 11326, 11429, 11479, 11510, 11629, 11694, 11721, 11747, 11941, 12021, 12063, 12089, 12243, 12350, 12383, 12414, 12598, 12685, 12715, 12758, 12881, 12963, 13013, 13060, 13195, 13297, 13325, 13349, 13517, 13725, 13821 |
| 8K (90) | 9, 25, 41, 154, 173, 301, 357, 477, 505, 609, 645, 761, 805, 909, 941, 1067, 1098, 1199, 1225, 1347, 1397, 1497, 1514, 1633, 1669, 1797, 1822, 1925, 1961, 2089, 2119, 2228, 2246, 2387, 2423, 2546, 2597, 2667, 2709, 2835, 2861, 2993, 3026, 3148, 3189, 3290, 3318, 3473, 3510, 3651, 3683, 3811, 3861, 3991, 4045, 4137, 4163, 4265, 4297, 4417, 4457, 4569, 4598, 4733, 4769, 4901, 4942 5073, 5113, 5253, 5289, 5389, 5413, 5539, 5585, 5714, 5755, 5847, 5371, 6010, 6045, 6175, 6207, 6345, 6379, 6482, 6525, 6649, 6675, 6862. |

15. The receiver of claim 13, wherein the second arrangement pattern is indicated in a following table showing subcarrier indexes corresponding to positions of the second pilots in the data symbol:

| FFT | CP position |
|---|---|
| 32K (380) Source Index | 163, 290, 466, 605, 614, 635, 662, 685, 691, 858, 1033, 1187, 1203, 1269, 1341, 1379, 1427, 1582, 1721, 1861, 1906, 1925, 1973, 2006, 2019, 2217, 2314, 2425, 2434, 2478, 2526, 2549, 2579, 2709, 2857, 3009, 3043, 3083, 3125, 3173, 3219, 3399, 3506, 3621, 3635, 3674, 3701, 3749, 3762, 3997, 4122, 4257, 4266, 4298, 4333, 4382, 4393, 4539, 4601, 4786, 4797, 4831, 4859, 4891, 4899, 5095, 5293, 5378, 5387, 5473, 5525, 5553, 5587, 5693, 5797, 5937, 5946, 5989, 6005, 6037, 6054, 6139, 6317, 6501, 6533, 6558, 6603, 6654, 6675, 6807, 6994, 7163, 7185, 7213, 7233, 7277, 7289, 7487, 7586, 7669, 7701, 7753, 7790, 7813, 7845, 8011, 8117, 8337, 8357, 8389, 8425, 8461, 8477, 8565, 8817, 6993, 8902, 8922, 8973, 8979, 9177, 9293, 9539, 9547, 9590, 9641, 9679, 9693, 9885, 10026, 13151, 10185, 10214, 10283, 10341, 10349, 10471, 10553, 10646, 10666, 10721, 10766, 10797, 10837, 10977, 11153, 11325, 11341, 11378, 11401, 11431, 11445, 11605, 11789, 11939, 11973, 11994, 12049, 12253, 12443, 12557, 12592, 12619, 12668, 12717, 12755, 12856, 12993, 13150, 13158, 13205, 13217, 13254, 13273, 13445, 13635, 13648, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17637, 17669, 17695, 17770, 17793, 17829, 17939, 18109, 18246, 18274, 18806, 18341, 18365, 18393, 18566, 18733, 18901, 18931, 18969, 18997, 19049, 19077, 19253, 19445, 19589, 19603, 19653, 19686, 19741, 19769, 19989, 20115, 20275, 20293, 20357, 20379, 20437, 20451, 20675, 20781, 20989, 21011, 21050, 21090, 21149, 21155, 21279, 21405, 21537, 21557, 21577, 21603, 21634, 21650, 21789, 21917, 22133, 22154, 22197, 22266, 22323, 22338, 22469, 22651, 22823, 22857, 22914, 22958, 22979, 23019, 23205, 23258, 23361, 23387, 232406, 23441, 23474, 23493, 23685, 236881, 24007, 24941, 24069, 24125, 24149, 24176, 24317, 24486, 24669, 24699, 24733, 24765, 24913, 24627, 25061, 25195, 25331, 25389, 25365, 25430, 25485, 25515, 25649, 25761, 25894, 25926, 25981, 26025, 26089, 26099, 26246, 26390, 26509, 26594, 26621, 26650, 26674, 26698, 26910, 27033, 27241, 27275, 27285, 27301, 27322, 27339, 27357, 27371, 27387, 27445, 27511, 27642, 27801 |
| 16K (180) | 82, 243, 307, 331, 346, 517, 602, 671, 714, 861, 953, 987, 1010, 1157, 1217, 1263, 1290, 1429, 1522, 1563, 1610, 1753, 1818, 1851, 1881, 2061, 2133, 2167, 2197, 2301, 2399, 2430, 2450, 2647, 2694, 2763, 2794, 2899, 2973, 3003, 3027, 3158, 3267, 3302, 3338, 3497, 3593, 3617, 3645, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5674, 5701, 5723, 5895, 5997, 6026, 6051, 6222, 6291, 6331, 6376, 6497, 6579, 6609, 6637, 6818, 6946, 6983, 7021, 7201, 7303, 7343, 7356, 7525, 7621, 7693, 7721, 7895, 7983, 8046, 8090, 8199, 8274, 8907, 8925, 8449, 8531, 8539, 8593, 8743, 8835, 8885, 8915, 9055, 9137, 9171, 9197, 9367, 9468, 9539, 9723, 9801, 9846, 9885, 10058, 10147, 10190, 10226, 10391, 10506, 15045, 10578, 10703, 10779, 10802, 10825, 10959, 11077, 11138, 11169, 11326, 11429, 11479, 11510, 11629, 11694, 11721, 11747, 11941, 12021, 12053, 12089, 12253, 12350, 12383, 12414, 12598, 12685, 12715, 12758, 12891, 12963, 13013, 13050, 13195, 13297, 13325, 13349, 13517, 13536, 13651, 13670, 13686, 13725, 13921 |
| 8K (90) | 41, 154, 173, 301, 357, 477, 505, 609, 645, 761, 805, 909, 941, 1067, 1098, 1199, 1225, 1347, 1397, 1487, 1514, 1633, 1669, 1797, 1822, 1925, 1961, 2089, 2119, 2226, 2245, 2387, 2423, 2546, 2587, 2667, 2709, 2835, 2861, 2993, 3026, 3146, 3189, 3290, 3319, 3473, 3510, 3651, 3683, 3811, 3861, 3991, 4045, 4137, 4163, 4265, 4297, 4417, 4457, 4569, 4598, 4733, 4769, 4901, 4942, 5073, 5113, 5253, 5289, 5389, 5413, 5539, 5585, 5714, 5755, 5847, 5873, 6010, 6045, 6175, 6207, 6342, 6379, 6492, 6525, 6649, 6675, 6819, 6835, 6862 |

16. The receiver of claim 13, wherein the first arrangement pattern is indicated in a following table showing subcarrier indexes corresponding to positions of the first pilots in the preamble symbol:

| FFT | CP position |
|---|---|
| 8K (44) | 41, 173, 357, 505, 645, 805, 941, 1098, 1225, 1397, 1514, 1669, 1822, 1961, 2118, 2245, 2423, 2587, 2709, 2861, 3026, 3189, 3318, 3510, 3683, 3861, 4045, 4163, 4297, 4457, 4598, 4769, |

-continued

| FFT | CP position |
|---|---|
| | 4942, 5113, 5289, 5413, 5585, 5755, 5873, 6045, 6207, 6379, 6525, 6675. |

17. The receiver of claim 13, wherein the second arrangement pattern is indicated in a following table showing subcarrier indexes corresponding to positions of the second pilots in the data symbol:

| FFT | CP position |
|---|---|
| 32K (356) Source Index | 35, 45, 61, 82, 99, 117, 131, 147, 163, 290, 486, 605, 614, 635, 662, 685, 691, 858, 1033, 1187, 1203, 1269, 1341, 1379, 1427, 1582, 1721, 1881, 1906, 1925, 1973, 2006, 2019, 2217, 2314, 2425, 2434, 2478, 2526, 2549, 2579, 2709, 2857, 3009, 3043, 3083, 3125, 3173, 3219, 3399, 3506, 3621, 3635, 3674, 3701, 3749, 3762, 3997, 4122, 4257, 4266, 4298, 4333, 4382, 4393, 4539, 4601, 4786, 4797, 4831, 4859, 4881, 4899, 5095, 5293, 5378, 5389, 5473, 5525, 5553, 5587, 5693, 5797, 5937, 5946, 5989, 6005, 6037, 6054, 6139, 6317, 6501, 6533, 6556, 6603, 6654, 6675, 6807, 6994, 7163, 7186, 7213, 7233, 7277, 7289, 7467, 7586, 7689, 7701, 7753, 7790, 7813, 7845, 8011, 8117, 8337, 8357, 8389, 8425, 8461, 8477, 8665, 8817, 8893, 8902, 8949, 8973, 8979, 9177, 9299, 9539, 9547, 9590, 9641, 9641, 9679, 9693, 9885, 10026, 10151, 10185, 10214, 10283, 10341, 10349, 10471, 10553, 10656, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12582, 12649, 12552, 12717, 12755, 12866, 12993, 13150, 13158, 13205, 13217, 13264, 13173, 13445, 13635, 13846, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17637, 17669, 17695, 17770, 17793, 17829, 17939, 18109, 15246, 18274, 18306, 18341, 18365, 18393, 18566, 18733, 18901, 18931, 18969, 18997, 19049, 19077, 19253, 19445, 19589, 19603, 19653, 19686, 19741, 19759, 19989, 20115, 20275, 20293, 220357, 20379, 20437, 20451, 20675, 20781, 20989, 21011, 21050, 21090, 21149, 21155, 21279, 21505, 21537, 21557, 21577, 21603, 21634, 21650, 21789, 21917, 22133, 22154, 22197, 22265, 22323, 22338, 22489, 22651, 22823, 22857, 22314, 22953, 22979, 23019, 23205, 23258, 23361, 23387, 23406, 23441, 23474, 23493, 23685, 23771, 24007, 24041, 24069, 24125, 24149, 24178, 24317, 24466, 24689, 24699, 24739, 24765, 24813, 24827, 25061, 25195, 25331, 25369, 25385, 25430, 25465, 25515, 25649, 25761, 25694, 25926, 25981, 26025, 26089, 26099, 26246, 26390, 26569, 26594, 26621, 26660, 26674, 26698, 26910, 27033, 27241 |
| 16K (178) | 18, 31, 50, 65, 82, 246, 307, 331, 346, 517, 602, 671, 714, 861, 953, 987, 1010, 1157, 1217, 1263, 1290, 1429, 1522, 1563, 1610, 1753, 1818, 1851, 1881, 2061, 2133, 2167, 2197, 2301, 2399, 2430, 2450, 2647, 2694, 2763, 2794, 2899, 2973, 3003, 3027 |

-continued

| FFT | CP position |
|---|---|
| | 3159, 3287, 3302, 3338, 3497, 3593, 3817, 3845, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5671, 5701, 5723, 5895, 5967, 6025, 6051, 6222, 6291, 6331, 6378, 6497, 6579, 6608, 6637, 6818, 6946, 6983, 7021, 7303, 7343, 7366, 7525, 7621, 7683, 7721, 7895, 7983, 8046, 8090, 8199, 8274, 8307, 8325, 8449, 8531, 8559, 8593, 8743, 8835, 8885, 8915, 9055, 9137, 9171, 9197, 9367, 9466, 9493, 9539, 9723, 9881, 9843, 9885, 10059, 10147, 10190, 10226, 10391, 10596, 10545, 10578, 10703, 10703, 10779, 10802, 10825, 10959, 11077 11133, 11169, 11326, 11429, 11479, 11510, 11629, 11694, 11721, 11747, 11941, 12021, 12063, 12089, 12243, 12350, 12383, 12414, 12598, 12685, 12715, 12758, 12881, 12963, 13013, 13060, 13195, 13297, 13325, 13349, 13517 |
| 8K (89) | 9, 25, 41, 154, 173, 301, 357, 477, 505, 609, 645, 761, 805, 909, 941, 1067, 1098, 1199, 1225, 1347, 1397, 1497, 1514, 1633, 1669, 1797, 1822, 1925, 1961, 2089, 2119, 2228, 2246, 2387, 2423, 2546, 2597, 2667, 2709, 2835, 2861, 2993, 3026, 3148, 3189, 3290, 3318, 3473, 3510, 3651, 3683, 3811, 3861, 3991, 4045, 4137, 4163, 4265, 4297, 4417, 4457, 4569, 4598, 4733, 4769, 4901, 4942 5073, 5113, 5253, 5289, 5389, 5413, 5539, 5585, 5714, 5755, 5847, 5371, 6010, 6045, 6175, 6207, 6345, 6379, 6482, 6525, 6649, 6675. |

18. The receiver of claim 13, wherein the second arrangement pattern is indicated in a following table showing subcarrier indexes corresponding to positions of the second pilots in the data symbol:

| FFT | CP position |
|---|---|
| 32K (348) Source Index | 163, 290, 466, 605, 614, 635, 662, 685, 691, 858, 1033, 1187, 1203, 1269, 1341, 1379, 1427, 1582, 1721, 1861, 1906, 1925, 1973, 2006, 2019, 2217, 2314, 2425, 2434, 2478, 2526, 2549, 2579, 2709, 2857, 3009, 3043, 3083, 3125, 3173, 3219, 3399, 3506, 3621, 3635, 3674, 3701, 3749, 3762, 3997, 4122, 4257, 4266, 4298, 4333, 4382, 4393, 4539, 4601, 4786, 4797, 4831, 4859, 4891, 4899, 5095, 5293, 5378, 5387, 5473, 5525, 5553, 5587, 5693, 5797, 5937, 5946, 6029, 6037, 6054, 6139, 6317, 6501, 6533, 6558, 6603, 6654, 6675, 6807, 6994, 7163, 7185, 7213, 7233, 7277, 7289, 7487, 7586, 7669, 7701, 7753, 7790, 7813, 7845, 8011, 8117, 8337, 8357, 8389, 8425, 8461, 8477, 8565, 8817, 6993, 8902, 8922, 8973, 8979, 9177, 9293, 9539, 9547, 9590, 9641, 9679, 9693, 9885, 10026, 13151, 10185, 10214, 10283, 10341, 10349, 10471, 10553, 10646, 10666, 10721, 10766, 10797, 10837, 10977, 11153, 11325, 11341, 11378, 11401, 11431, 11445, 11605, 11789, 11939, 11973, 11994, 12049, 12070, 12102, 12253, 12443, 12557, 12592, 12619, 12668, 12717, 12755, 12856, 12993, 13150, 13158, 13205, 13217, 13254, 13273, 13445, 13635, 13648, 13891, 13907, 13965, 14002, 14041, 14225, 14402, 14571, 14605, 14637, 14685, 14714, 14731, 14917, 15050, 15209, 15242, 15282, 15365, 15390, 15442, 15622, 15790, 15953, 15965, 16055, 16091, 16163, 16179, 16239, 16397, 16533, 16547, 16577, 16613, 16630, 16650, 16750, 16897, 17045, 17061, 17089, 17137, 17173, 17186, 17351, 17485, 17637, 17669, 17695, 17770, 17793, 17839, 17939, 18109, 18246, 18274, 18806, 18341, 18365, 18393, 18566, 18733, 18901, 18931, 18969, 18997, 19049, 19077, 19253, 19445, 19589, 19603, 19653, 19686, 19741, 19769, 19989, 20115, 20275, 20293, 20357, 20379, 20437, 20451, 20675, 20781, 20989, 21011, 21050, 21090, 21149, 21155, 21279, 21405, 21537, 21557, 21577, 21603, 21634, 21650, 21789, 21917, 22133, 22154, 22197, 22266, 22323, 22338, 22469, 22651, 22823, 22857, 22914, 22958, 22979, 23019, 23205, 23258, 23361, 23387, 23394, 23441, 23474, 23493, 23585, 236881, 24007, 24041, 24069, 24125, 24149, 24176, 24317, 24486, 24669, 24699, 24733, 24765, 24913, 24627, 25061, 25195, 25331, 25389, 25365, 25430, 25485, 25515, 25649, 25761, 25894, 25926, 25981, 26025, 26089, 26099, 26246, 26390, 26509, 26594, 26621, 26650, 26674, 26698, 26910, 27033, 27241 |
| 16K (176) | 82, 243, 307, 331, 346, 517, 602, 671, 714, 861, 953, 987, 1010, 1157, 1217, 1263, 1290, 1429, 1522, 1563, 1610, 1753, 1818, 1851, 1881, 2061, 2133, 2167, 2197, 2301, 2399, 2430, 2450, 2647, 2694, 2763, 2794, 2899, 2973, 3003, 3027, 3158, 3202, 3338, 3497, 3593, 3617, 3645, 3793, 3851, 3895, 3923, 4059, 4179, 4213, 4239, 4409, 4451, 4475, 4490, 4647, 4774, 4821, 4847, 5013, 5093, 5142, 5175, 5277, 5333, 5383, 5419, 5577, 5674, 5701, 5723, 5895, 5997, 6026, 6051, 6222, 6291, 6331, 6376, 6497, 6579, 6609, 6637, 6818, 6946, 6983, 7021, 7201, 7303, 7343, 7356, 7525, 7621, 7693, 7721, 7895, 7983, 8046, 8090, 8199, 8274, 8907, 8925, 8449, 8531, 8539, 8593, 8743, 8835, 8885, 8915, 9055, 9137, 9171, 9197, 9367, 9468, 9539, 9723, 9801, 9846, 9885, 10058, 10147, 10190, 10226, 10391, 10506, 15045, 10578, 10703, 10779, 10802, 10825, 10959, 11077, 11138, 11169, 11326, 11429, 11479, 11510, 11629, 11694, 11721, 11747, 11941, 12021, 12053, 12089, 12253, 12350, 12383, 12414, 12598, 12685, 12715, 12758, 12891, 12963, 13013, 13050, 13195, 13297, 13325, 13349, 13517, 13536, 13651 |
| 8K (87) | 41, 154, 173, 301, 357, 477, 505, 609, 645, 761, 805, 909, 941, 1067, 1098, 1199, 1225, 1347, 1397, 1487, 1514, 1633, 1669, 1797, 1822, 1925, 1961, 2089, 2119, 2226, 2245, 2387, 2423, 2546, 2587, 2667, 2709, 2835, 2861, 2993, 3026, 3146, 3189, 3290, 3319, 3473, 3510, 3651, 3683, 3811, 3861, 3991, 4045, 4137, 4163, 4265, 4297, 4417, 4457, 4569, 4598, 4733, 4769, 4901, 4942, 5073, 5113, 5253, 5289, 5389, 5413, 5539, 5585, 5714, 5755, 5847, 5873, 6010, 6045, 6175, 6207, 6342, 6379, 6492, 6525, 6649, 6675. |

19. A method of controlling a transmitter, the method comprising:
generating a plurality of frames each of which comprises a preamble symbol and a data symbol;
inserting a plurality of first pilots in the preamble symbol of a frame according to a predetermined first arrangement pattern and inserting a plurality of second pilots in the data symbol of the fame according to a second arrangement pattern; and
transmitting the plurality of frames in which the first pilots and the second pilots are inserted.

20. A method of controlling a receiver, the method comprising:
receiving a plurality of frames, each of which comprises a preamble symbol in which a plurality of first pilots are inserted according to a first arrangement pattern and a data symbol in which a plurality of second pilots are inserted according to a second arrangement pattern; and
detecting the first pilots and the second pilots respectively based on the first arrangement pattern and the second arrangement pattern, synchronizing the preamble symbol of a frame and the data symbol of the frame respectively using the detected first pilots and second pilots, and detecting data from the data symbol.

* * * * *